United States Patent
Goyal et al.

(10) Patent No.: US 10,460,250 B2
(45) Date of Patent: *Oct. 29, 2019

(54) SCOPE IN DECISION TREES

(71) Applicant: Cavium, LLC, Santa Clara, CA (US)

(72) Inventors: Rajan Goyal, Saratoga, CA (US); Kenneth A. Bullis, Los Altos, CA (US)

(73) Assignee: Cavium, LLC, Santa Clara, CA (US)

( * ) Notice: Subject to any disclaimer, the term of this patent is extended or adjusted under 35 U.S.C. 154(b) by 913 days.

This patent is subject to a terminal disclaimer.

(21) Appl. No.: 14/922,449

(22) Filed: Oct. 26, 2015

(65) Prior Publication Data

US 2016/0071016 A1    Mar. 10, 2016

Related U.S. Application Data

(63) Continuation of application No. 13/840,867, filed on Mar. 15, 2013, now Pat. No. 9,195,939.

(51) Int. Cl.
*G06N 5/02* (2006.01)
*G06N 5/04* (2006.01)
*G06F 16/22* (2019.01)

(52) U.S. Cl.
CPC ......... *G06N 5/045* (2013.01); *G06F 16/2246* (2019.01); *G06N 5/02* (2013.01)

(58) Field of Classification Search
CPC ...... G06N 5/05; G06N 5/02; G06F 17/30327; G06F 16/2246
See application file for complete search history.

(56) References Cited

U.S. PATENT DOCUMENTS 5,107,361 A    4/1992   Kneidinger et al.
5,463,777 A   10/1995   Bialkowski et al.
(Continued)

FOREIGN PATENT DOCUMENTS

CN         1535460 A    10/2004
CN       101351784 A     1/2009
(Continued)

OTHER PUBLICATIONS

Gupta et al., "Classifying Packets with Hierarchical Intelligent Cuttings", IEEE Micro, vol. 20, Issue 1, Jan./Feb. 2000 (Year: 2000).*

(Continued)

*Primary Examiner* — Li B. Zhen
*Assistant Examiner* — Tsu-Chang Lee
(74) *Attorney, Agent, or Firm* — Hamilton, Brook, Smith & Reynolds, P.C.

(57) ABSTRACT

A root node of a decision tree data structure may cover all values of a search space used for packet classification. The search space may include a plurality of rules, the plurality of rules having at least one field. The decision tree data structure may include a plurality of nodes, the plurality of nodes including a subset of the plurality of rules. Scope in the decision tree data structure may be based on comparing a portion of the search space covered by a node to a portion of the search space covered by the node's rules. Scope in the decision tree data structure may be used to identify whether or not a compilation operation may be unproductive. By identifying an unproductive compilation operation it may be avoided, thereby improving compiler efficiency as the unproductive compilation operation may be time-consuming.

18 Claims, 35 Drawing Sheets

(56) References Cited

U.S. PATENT DOCUMENTS

| | | | |
|---|---|---|---|
| 5,909,699 A | 6/1999 | Sarangdhar et al. | |
| 6,233,575 B1 | 5/2001 | Agrawal et al. | |
| 6,298,340 B1 | 10/2001 | Calvignac et al. | |
| 6,467,019 B1 | 10/2002 | Washburn | |
| 6,473,763 B1 | 10/2002 | Corl et al. | |
| 6,476,763 B2 | 11/2002 | Allen | |
| 6,578,131 B1 | 6/2003 | Larson et al. | |
| 6,587,466 B1* | 7/2003 | Bhattacharya | H04L 41/0893 |
| | | | 370/395.21 |
| 6,735,600 B1 | 5/2004 | Andreev | |
| 6,778,530 B1 | 8/2004 | Greene | |
| 6,868,414 B2 | 3/2005 | Khanna et al. | |
| 6,980,555 B2 | 12/2005 | Mar | |
| 7,023,807 B2 | 4/2006 | Michels et al. | |
| 7,039,641 B2 | 5/2006 | Woo | |
| 7,366,728 B2 | 4/2008 | Corl, Jr. et al. | |
| 7,415,472 B2 | 8/2008 | Testa | |
| 7,441,022 B1 | 10/2008 | Schuba et al. | |
| 7,509,300 B2 | 3/2009 | Sahni et al. | |
| 7,522,581 B2 | 4/2009 | Acharya et al. | |
| 7,536,476 B1 | 5/2009 | Alleyne | |
| 7,546,234 B1 | 6/2009 | Deb et al. | |
| 7,548,944 B2 | 6/2009 | Sahita | |
| 7,571,156 B1 | 8/2009 | Gupta et al. | |
| 7,937,355 B2 | 5/2011 | Corl et al. | |
| 8,005,869 B2 | 8/2011 | Corl et al. | |
| 8,156,507 B2 | 4/2012 | Brjazovski et al. | |
| 8,447,120 B2 | 5/2013 | Ji et al. | |
| 8,477,611 B2 | 7/2013 | Lim | |
| 8,856,203 B1 | 10/2014 | Schelp et al. | |
| 8,934,488 B2 | 1/2015 | Goyal et al. | |
| 8,937,952 B2 | 1/2015 | Goyal et al. | |
| 8,937,954 B2 | 1/2015 | Goyal et al. | |
| 9,137,340 B2 | 9/2015 | Goyal et al. | |
| 9,183,244 B2 | 11/2015 | Bullis et al. | |
| 9,191,321 B2 | 11/2015 | Goyal et al. | |
| 9,195,939 B1 | 11/2015 | Goyal et al. | |
| 9,208,438 B2 | 12/2015 | Goyal et al. | |
| 9,430,511 B2 | 8/2016 | Billa et al. | |
| 9,595,003 B1 | 3/2017 | Bullis et al. | |
| 10,083,200 B2 | 9/2018 | Goyal et al. | |
| 10,229,139 B2 | 3/2019 | Goyal et al. | |
| 10,229,144 B2 | 3/2019 | Billa et al. | |
| 2002/0023089 A1 | 2/2002 | Woo | |
| 2002/0124086 A1 | 9/2002 | Mar | |
| 2002/0143747 A1 | 10/2002 | Tal et al. | |
| 2003/0115403 A1 | 6/2003 | Bouchard et al. | |
| 2003/0123459 A1 | 7/2003 | Liao | |
| 2003/0135704 A1 | 7/2003 | Martin | |
| 2004/0095936 A1 | 5/2004 | O'Neill et al. | |
| 2005/0013293 A1 | 1/2005 | Sahita | |
| 2005/0240604 A1 | 10/2005 | Corl et al. | |
| 2006/0026138 A1 | 2/2006 | Robertson et al. | |
| 2006/0098652 A1 | 5/2006 | Singh et al. | |
| 2006/0136570 A1 | 6/2006 | Pandya | |
| 2006/0155915 A1 | 7/2006 | Pereira | |
| 2006/0221967 A1 | 10/2006 | Narayan et al. | |
| 2006/0253465 A1 | 11/2006 | Willis et al. | |
| 2007/0168377 A1 | 7/2007 | Zabarsky | |
| 2008/0031258 A1 | 2/2008 | Acharya et al. | |
| 2008/0109392 A1 | 5/2008 | Nandy | |
| 2008/0120441 A1 | 5/2008 | Loewenstein | |
| 2008/0140631 A1 | 6/2008 | Pandya | |
| 2008/0177994 A1 | 7/2008 | Mayer | |
| 2008/0310440 A1 | 12/2008 | Chen et al. | |
| 2009/0125470 A1 | 5/2009 | Shah et al. | |
| 2009/0185568 A1 | 7/2009 | Cho et al. | |
| 2009/0274384 A1 | 11/2009 | Jakobovits | |
| 2010/0034202 A1 | 2/2010 | Lu et al. | |
| 2010/0067535 A1* | 3/2010 | Ma | H04L 43/028 |
| | | | 370/401 |
| 2010/0110936 A1 | 5/2010 | Bailey et al. | |
| 2010/0175124 A1 | 7/2010 | Miranda | |
| 2011/0038375 A1 | 2/2011 | Liu et al. | |
| 2011/0137930 A1 | 6/2011 | Hao et al. | |
| 2011/0167416 A1 | 7/2011 | Sager et al. | |
| 2011/0219010 A1 | 9/2011 | Lim | |
| 2011/0270889 A1 | 11/2011 | Stevens et al. | |
| 2011/0307436 A1* | 12/2011 | Cai | G06F 17/30625 |
| | | | 706/48 |
| 2012/0110656 A1* | 5/2012 | Santos | H04L 63/0263 |
| | | | 726/13 |
| 2013/0036102 A1 | 2/2013 | Goyal et al. | |
| 2013/0039366 A1 | 2/2013 | Goyal et al. | |
| 2013/0060727 A1 | 3/2013 | Goyal et al. | |
| 2013/0070753 A1 | 3/2013 | Sahni et al. | |
| 2013/0085978 A1 | 4/2013 | Goyal et al. | |
| 2013/0166886 A1 | 6/2013 | Sasanka et al. | |
| 2013/0201831 A1 | 8/2013 | Tal et al. | |
| 2013/0218853 A1 | 8/2013 | Bullis et al. | |
| 2013/0232104 A1 | 9/2013 | Goyal et al. | |
| 2013/0238576 A1 | 9/2013 | Binkert et al. | |
| 2013/0282766 A1 | 10/2013 | Goyal et al. | |
| 2014/0279850 A1 | 9/2014 | Goyal et al. | |
| 2014/0280357 A1 | 9/2014 | Goyal et al. | |
| 2014/0281809 A1 | 9/2014 | Goyal et al. | |
| 2015/0117461 A1 | 4/2015 | Goyal et al. | |

FOREIGN PATENT DOCUMENTS

| | | |
|---|---|---|
| CN | 101501637 A | 8/2009 |
| JP | 2002290447 A | 10/2002 |
| WO | WO 2009/145712 A1 | 12/2009 |
| WO | WO 2013/020002 A1 | 2/2013 |
| WO | WO 2013/020003 A1 | 2/2013 |

OTHER PUBLICATIONS

Singh, et al., "Packet classification using multidimensional cutting", Proceedings of the ACM 2003 Conference on Applications, Technologies, Architectures, and Protocols for Computer Communications, Karlscuhe, Germany, Aug. 25-29, 2003 (Year: 2003).* http://en.wikipedia.org/Access_control_list, downloaded Feb. 4, 2011.

Abdelghani, M., et al. "Packet Classification Using Adaptive Rule Cutting," IEEE (2005).

Baboescu, F. and Varghese, G., "Scalable Packet Classification," Proceedings of the ACMSIGCOMM '01 Conference on Applications, Technologies, Architectures, and Protocols for Computer Communication (SIGCOMM '01), pp. 199-210 (2001).

Baboescu, F., et al., "Packet Classification for Core Routers: Is there an alternative to CAMs?", Proceedings f the 22$^{nd}$ IEEE Conference on Computer Communications (INFOCOM '03), vol. 1, pp. 53-63 (2003).

Gupta, P. and McKeown, N. "Classifying Packets With Hierarchical Intelligent Cuttings," IEEE Micro, 20(1):34-41 (2000).

Gupta, P. and McKeown, N. "Packet Classification on Multiple Fields," Proceedings of SIGCOMM '99 Conference on Applications, Technologies, Architectures, and Protocols for Computer Communication (SIGCOMM '99), pp. 147-160 (1999).

Gupta, P., "Algorithms for Packet Routing Lookups and Packet Classification," Dissertation submitted to the Dept. of Comp. Science of Stanford Univ. (Dec. 2000).

Pong et al., HaRP: Rapid Packet Classification via Hashing Round-Down Prefixes, IEEE Transactions Parallel and Distributed Systems, IEEE Service Center, v. 22(7), pp. 1105-1119 (2011).

Qi, Y., et al., "Packet Classification Algorithms: From Theory to Practice," Proceedings of the 28$^{th}$ IEEE Conference on Computer Communications (INFOCOM '09), pp. 648-656 (2009).

Singh, S., et al., "Packet Classification Using Multidimensional Cutting," Proceedings of the ACMSIGCOMM '03 Conference on Applications, Technologies, Architectures, and Protocols for Computer Communication (SIGCOMM '03), pp. 213-224 (2003).

Theiling, Henrik "Generating Decision Trees for Decoding Binaries" ACM 2001 [Online] Downloaded Jul. 14, 2015 http://delivery.acm.org/10.1145/390000/384213/p112-theiling.pdf?ip=151.207.250.51&id=384213&acc=ACTIVE%20SERVICE&key=C15944E53D0ACA63%2E4D4702B0C3E38B35%2 E4 D4 702B0C3 E38B35%2E4 D4 702B0C3 E38B35&C F1 D=528083660&C FTOKEN=15678279& acm =1436903293 abc.

(56) References Cited

OTHER PUBLICATIONS

Yu, L., et al., "A Novel IP Packet Classification Algorithm Based on Hierarchical Intelligent Cuttings," *IEEE 6th Int. Conf. on ITS Telecom. Proceedings* 1033-1036 (2006).

Zhang, B., et al., "On Constructing Efficient Shared Decision Trees for Multiple Packet Filters," Dept. Computer Science Rice University (2010).

* cited by examiner

SCOPE IN DECISION TREES

RELATED APPLICATION

This application is a continuation of U.S. application Ser. No. 13/840,867, filed Mar. 15, 2013, now U.S. Pat. No. 9,195,939. The entire teachings of the above application is incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY

According to one embodiment a method may comprise compiling a decision tree data structure including a plurality of nodes using a classifier table having a plurality of rules representing a search space for packet classification. The plurality of rules may have at least one field. The plurality of nodes may each cover a portion of the search space by representing successively smaller subsets of the plurality of rules with increasing depth in the decision tree data structure. For each node of the decision tree data structure, the method may compute a node scope value indicating a node portion of the search space covered by the node. For each node of the decision tree data structure, the method may for each rule intersecting the node, compute a rule scope value indicating a rule portion of the node portion covered by the rule. For each node of the decision tree data structure, the method may compare the node portion of the search space covered by the node to an amount of the node portion covered by rules intersecting the node by computing a scope factor for the node based on the node scope value computed and the rule scope value computed for each rule. The method may use the scope factor computed for at least one node of the plurality of nodes as an input parameter to a decision for performing a compiler operation at the at least one node.

To compute the node scope value the method may include computing a node field scope value for each at least one field covered by the node portion of the search space and summing each node field scope value computed to compute a total node scope value for the node. To compute the rule scope value the method may include computing a rule field scope value for each at least one field of each rule intersecting the node and summing each rule field scope computed to compute a total rule scope value for each rule. To compute the scope factor for the node the method may include averaging a ratio of the total rule scope computed for each rule to the total node scope value computed for the node.

The node scope value may increase as the node portion of the search space covered by the node increases. The node scope value may decrease as the node portion of the search space covered by the node decreases. The rule scope may increase as the rule portion of the node portion covered by the rule increases. The rule scope may decrease as the rule portion of the node portion covered by the rule decreases.

To compute the node scope value the method may include determining a minimum number of bits for enumerating all values of the search space covered by the node on a per field basis and setting the node scope value to a sum of the minimum number of bits determined for each at least one field.

To compute the rule scope value the method may include intersecting each at least one field of the rule with the node portion of the search space covered by the node to identify non-intersecting portions of the rule. The method may trim the non-intersecting portions identified from each at least one field of the rule. The method may determine a number of bits for enumerating all values of the search space covered by each at least one field of the rule trimmed. The method may set the rule scope value to a sum of the number of bits determined for each at least one field.

To compute the scope factor for the node based on the node scope value computed and the rule scope value computed for each rule represented by the node the method may include computing a ratio of the rule scope value computed for each rule represented by the node to the node scope value computed. The method may determine an average value for the ratios computed.

The method may comprise grouping same fields of the at least one field of the plurality of rules. The method may comprise enabling access to multiple same fields grouped in a single access by storing together the same fields grouped, wherein same fields grouped may have same field dimensions and may be fields of different rules.

The method may comprise, for each node of the decision tree data structure, determining a number of cuts for a selected one or more fields of the at least one field, the number of cuts being based on the scope factor computed for the node. The method may comprise, for each node of the decision tree data structure, creating child nodes by cutting the node on a selected one or more bits of the selected one or more fields based on the number of cuts determined. The method may comprise storing the decision tree data structure.

The number of cuts determined may increase as the scope factor computed decreases and the number of cuts determined may decrease as the scope factor computed increases.

The method may include, for each node of the decision tree, traversing a list of rules represented by the node in a single sweep. The method may include, for each node of the decision tree data structure, assigning one or more rules from the list traversed in the single sweep to each of the child nodes created based on the one or more rules being within regions of the search space bounded by the child nodes created as a function of the cutting of the node.

The compiler operation may include searching for redundant rules at the at least one node. The decision for performing the compiler operation at the at least one node may be based on a comparison of the scope factor computed to a given threshold.

The comparison of the scope factor computed to the given threshold may enable avoiding a time-consuming unproductive search for redundant rules at the at least one node.

The plurality of rules may have an associated priority. The search for redundant rules at the at least one node may include determining whether or not a given rule represented by the at least one node is covered by one or more other higher priority rules represented by the at least one node. The search for redundant rules at the at least one node may include omitting the given rule from the at least one node and other nodes cut from the at least one node if the given rule is covered. The search for redundant rules at the at least one node may include populating one or more cover lists for the one or more higher priority rules to include the given rule omitted, the one or more cover lists may each be associated with the at least one node.

The method may further comprise receiving an incremental update for the decision tree data structure compiled, determining one or more updates to the decision tree data structure compiled based on the incremental update received, and incrementally adjusting the scope factor computed for at least one node of the plurality of nodes based on the one or more updates determined.

The compiler operation may include cutting at least one node of the plurality of nodes and the method may further comprise creating a plurality of scope factor ranges and associating each scope factor range with a unique cutting range and a unique maximum replication factor. The method may for each node of the decision tree data structure, include identifying a scope factor range including the scope factor computed for the node. The method may for each node of the decision tree data structure, include identifying the unique cutting range associated with the scope factor range identified. The method may for each node of the decision tree data structure, include iteratively selecting a number of cuts from the unique cutting range identified, computing a total number of rules based on cuts of the node using the number of cuts iteratively selected, and setting a desired number of cuts to the number of cuts iteratively selected based on a comparison of the total number of rules computed divided by a number of rules represented by the node to the unique maximum replication factor associated with the scope factor range identified. The desired number of cuts set may be a maximum value within the unique cutting range selected based on the comparison. The method may include cutting the node into children using the desired number of cuts set.

The method may include storing each of the plurality of scope factor ranges with an associated unique cutting range and a unique maximum replication factor, wherein iteratively selecting the number of cuts includes accessing an entry of a lookup table (LUT) associated with the scope factor range identified.

The method may include associating a node bitstring with the node, the node bitstring enabling enumeration of all possible values of the node, wherein the node bitstring includes zero or more don't care bits. For each rule of the node, the method may include associating a rule bitstring with the rule, the rule bitstring enabling enumeration of all values of the rule, wherein the rule bitstring includes zero or more don't care bits. Computing the node scope value may include computing a node field scope value for each at least one field covered by the node portion of the search space and summing each node field scope value computed to compute a total node scope value for the node, wherein the node field scope value for each at least one field may be based on a number of the zero or more don't care bits included in the node bitstring. Computing the rule scope value may include computing a rule field scope value for each at least one field of each rule intersecting the node and summing each rule field scope computed to compute a total rule scope value for each rule, wherein each rule intersecting the node may have zero or more don't care bits in the rule bitstring associated with the rule in a same location as a don't care bit in the node bitstring associated with the node. The rule scope value computed may be based on the number of bit positions in which both the rule bitstring and the node bitstring have don't-care bits. Computing the scope factor for the node may include averaging a ratio of the total rule scope computed for each rule to the total node scope value computed for the node.

Another example embodiment disclosed herein includes an apparatus corresponding to operations consistent with the method embodiments described above.

Further, yet another example embodiment may include a non-transitory computer-readable medium having stored thereon a sequence of instructions which, when loaded and executed by a processor, causes the processor to complete methods consistent with the method embodiments described above.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
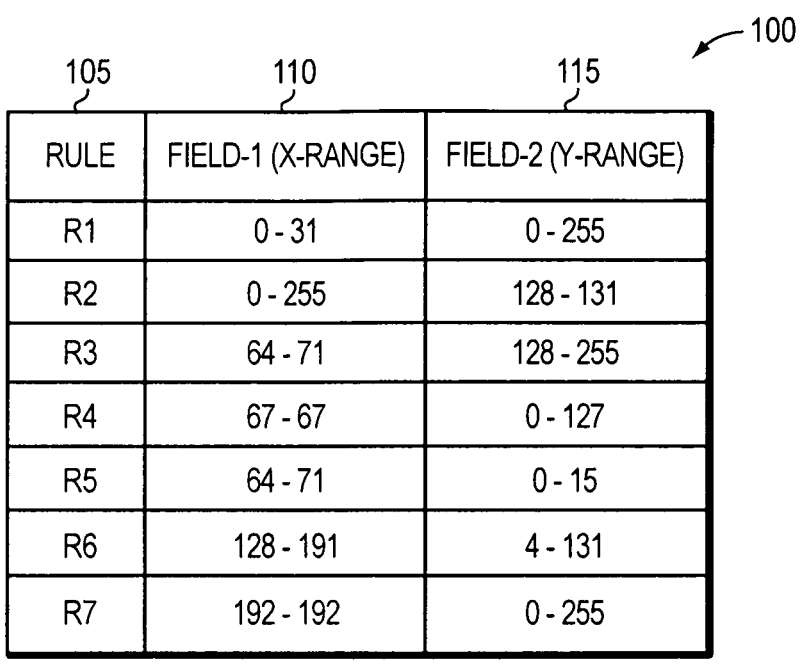
FIG. 1 illustrates a classifier table including rules for classifying a packet.

A description of example embodiments of the invention follows.

The teachings of all patents, published applications and references cited herein are incorporated by reference in their entity.

Although packet classification has been widely studied for a long time, researchers are still motivated to seek novel and efficient packet classification solutions due to: i) the continual growth of network bandwidth, ii) increasing complexity of network applications, and iii) technology innovations of network systems.

Explosion in demand for network bandwidth is generally due to the growth in data traffic. Leading service providers report bandwidths doubling on their backbone networks about every six to nine months. As a consequence, novel packet classification solutions are required to handle the exponentially increasing traffics on both edge and core devices.

Complexity of network applications are increasing due to the increasing number of network applications being implemented in network devices. Packet classification is widely-used for various kinds of applications, such as service-aware routing, intrusion prevention and traffic shaping. Therefore, novel solutions of packet classification must be more intelligent to handle diverse types of rule sets without significant loss of performance.

In addition, new technologies, such as multi-core processors provide unprecedented computing power, as well as highly integrated resources. Thus, novel packet classification solutions must be well suited to advanced hardware and software technologies.

Before describing example embodiments in detail, an example packet classification system and related methods are described immediately below to help the reader understand the inventive features described herein.

Existing packet classification methods trade memory for time. Although the tradeoffs have been constantly improving, the time taken for a reasonable amount of memory is still generally poor. Because of problems with existing methods, vendors use ternary content-addressable memory (TCAM), which uses brute-force parallel hardware to simultaneously check packets against all rules. The main advantages of TCAMs over existing methods are speed and determinism (TCAMs work for all databases).

A TCAM is a hardware device that functions as a fully associative memory. A TCAM cell stores three values: 0, 1, or 'X,' which represents a don't-care bit and operates as a per-cell mask enabling the TCAM to match rules containing wildcards (e.g., don't care bits). In operation, a whole packet header can be presented to a TCAM to determine which entry (rule) it matches. However, the complexity of TCAMs has permitted only small, inflexible, and relatively slow implementations that consume a lot of power. Therefore, a need continues for efficient methods operating on specialized data structures.

Current methods remain in the stages of mathematical analysis and/or software simulation (observation based solutions). Proposed mathematic solutions have been reported to have excellent time/spatial complexity. However, methods of this kind have not been found to have any implementation in real-life network devices because mathematical solutions often add special conditions to simplify a problem and/or omit large constant factors which might conceal an explicit worst-case bound.

Proposed observation based solutions employ statistical characteristics observed in rules to achieve efficient solution for real-life applications. However, these observation based methods generally only work well with specific types of rule sets. Because packet classification rules for different applications have diverse features, few observation based methods are able to fully exploit redundancy in different types of rule sets to obtain stable performance under various conditions.

Packet classification is performed using a packet classifier, also called a policy database, flow classifier, or simply a classifier. A classifier is a collection of rules or policies. Packets received are matched with rules, which determine actions to take with a matched packet. Generic packet classification requires a router to classify a packet on the basis of multiple fields in a header of the packet. Each rule of the classifier specifies a class that a packet may belong to, according to criteria on 'F' fields of the packet header, and associates an identifier (e.g., class ID) with each class. For example, each rule in a flow classifier is a flow specification, in which each flow is in a separate class. The identifier uniquely specifies an action associated with each rule. Each rule has 'F' fields. An ith field of a rule R, referred to as R[i], is a regular expression on the ith field of the packet header. A packet P matches a particular rule R if for every i, the ith field of the header of P satisfies the regular expression R[i].

Classes specified by the rules may overlap. For instance, one packet may match several rules. In this case, when several rules overlap, an order in which the rules appear in the classifier may determine the rule's relative priority. In other words, a packet that matched multiple rules belongs to the class identified by the identifier (class ID) of the rule among them that appears first in the classifier. Alternatively, a unique priority associated with a rule may determine its priority, for example, the rule with the highest priority.

Packet classifiers may analyze and categorize rules in a classifier table and create a decision tree data structure that is used to match received packets with rules from the classifier table. A decision tree data structure is a decision support tool that uses a tree-like graph or model of decisions and their possible consequences, including chance event outcomes, resource costs, and utility. Decision trees are commonly used in operations research, specifically in decision analysis, to help identify a strategy most likely to reach a goal. Another use of decision trees is as a descriptive means for calculating conditional probabilities. Embodiments described herein utilize decision trees to selectively match a received packet with a rule in a classifier table to determine how to process the received packet.

A decision tree data structure of rules, or tree, represents a set of rules. The decision tree may also be called a Rule Compiled Data Structure (RCDS) or a performance tree. The tree is a structure having nodes and leaves. Each leaf of the tree points to a subset of the rules, called a bucket of rules, or bucket. Each of the buckets represents a subset of the rules. Each bucket is a data structure (e.g., an array) containing pointers to rules, which are stored in a rule table. Rules (or pointers to rules) within a bucket are ordered by priority (e.g., in increasing or decreasing priority). A rule table is a data structure (e.g., an array) containing the rules. Rules within the rule table may be ordered or unordered.

FIG. 1 illustrates a classifier table 100 including rules 105 for classifying a packet. As illustrated, the classifier table contains seven rules (R1-R7), each containing two fields, Field-1 110, and Field-2 115. Although the table illustrates the rules 105 as being 2-tuple (e.g., containing only two fields), it should be noted that rules may contain an n number of fields and be n-tuple. Each rule specifies a range of values (e.g., Internet Protocol (IP) addresses or Layer 4 ports or protocols) in each dimension (field). For example, Field-1 110 may be represented in the x-dimension of an x/y graph, while Field-2 115 may be represented in the y-dimension of an x/y graph.

Figure 2:
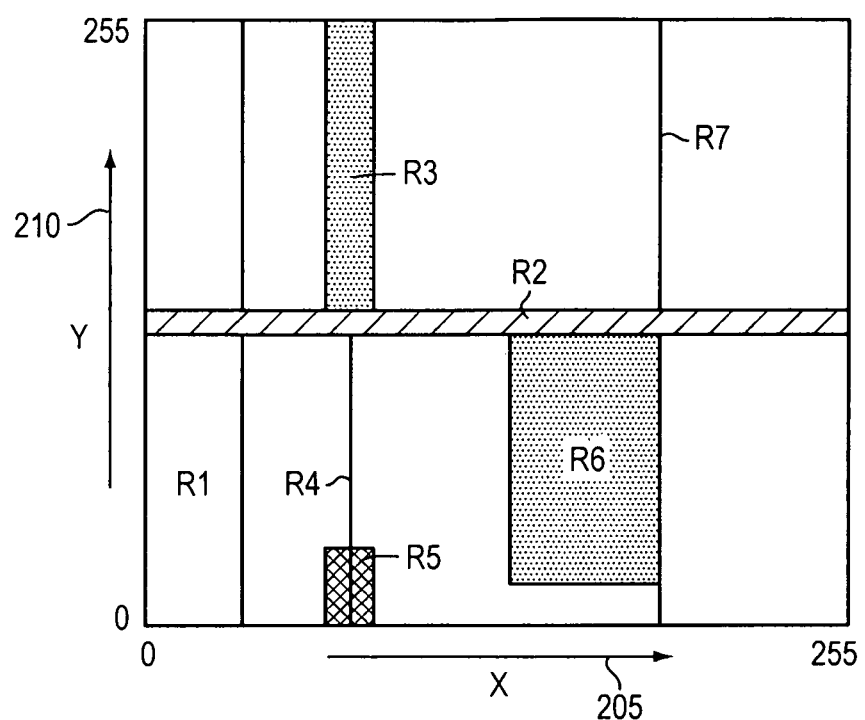
FIG. 2 illustrates a geometric representation of the rules of the classifier table illustrated in FIG. 1.

FIG. 2 illustrates a geometric representation of the rules of the classifier table 100. The rules range from values 0-255 in both the x-dimension 205 and y-dimension 210. As illustrated, each dimension of the graph is subdivided based on the ranges of each field of each rule from classifier table 100.

Figure 3A:
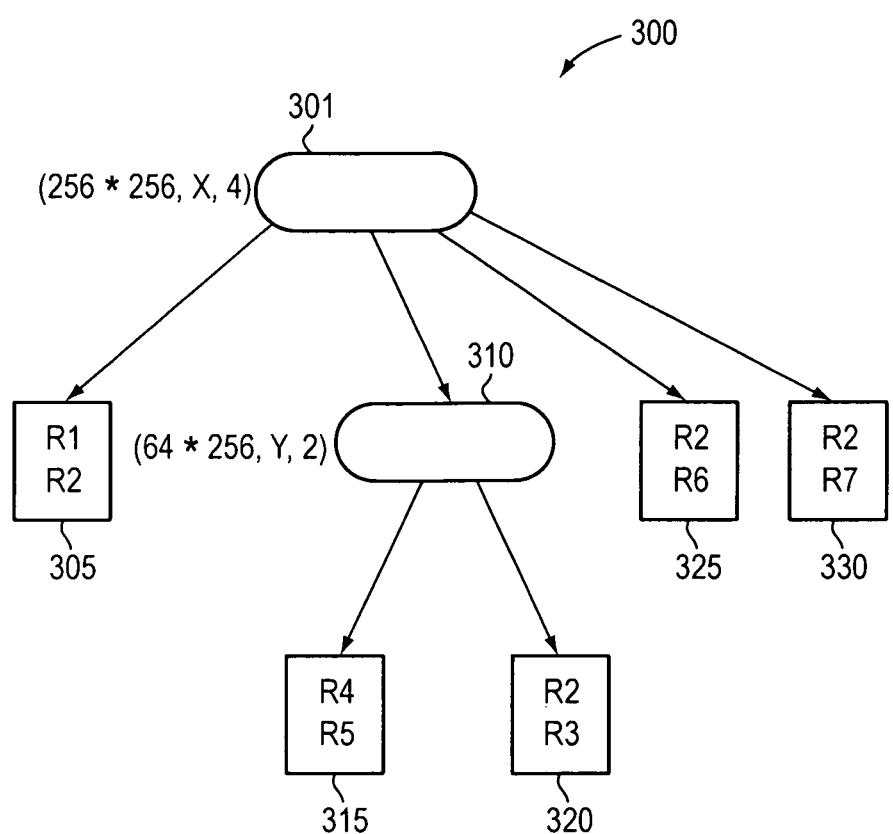
FIG. 3A illustrates a decision tree data structure compiled from the classifier table illustrated in FIG. 1.

FIG. 3A illustrates a decision tree data structure 300 compiled from the classifier table 100. The decision tree data structure 300 contains a set of elements called nodes (301, 305, 310, 315, 320, 325, 330) that are empty or satisfy one of the following conditions: i) there is a distinguished node r, called the root node, and ii) the remaining nodes are divided into disjoint subsets, each of which is a sub-tree. As illustrated, node 301 is the root node of the decision tree and a parent node of nodes 305, 310, 325, and 330, which are considered child nodes of root node 301. The degree of a node is the number of nonempty sub-trees the node contains. A node with degree zero is considered a leafnode. Thus, nodes 305, 315, 320, 325, and 330 are considered leaf nodes. Nodes with a positive degree are internal nodes (e.g., node 310).

Each node of the decision tree data structure 300 contains a subset of rules of a classifier table. As stated above, each rule has 'F' fields and an ith field of a rule R, referred to as R[i], is a regular expression on the ith field of a received packet header. A packet P matches a particular rule R if for every i, the ith field of the header of P satisfies the regular expression R[i]. Thus, when a packet is received, a decision tree is walked (e.g., by a runtime walker) to determine a matching rule, which is used to determine an action to take with the received packet.

For example, if a packet is received that contains headers matching rule R7 (see FIG. 1), decision tree data structure 300 is walked (e.g., traversed) to find matching rule R7. Thus, the packet is first passed through root node 301, which contains all rules of the packet classification table, which has been cut into four children. Cutting a node refers to subdividing the node into n number of child nodes. The n number of child nodes created corresponds to the number of cuts (subdivisions) of the node that are made. In this example, the rules in root node 301 have been subdivided into four rule lists (e.g., corresponding to each child node 305, 310, 325, and 330). Thus, it is determined that the packet should be passed to child node 330 that contains a subset of rules having fields within a range of each header of the received packet. After the packet is passed to node 330, the packet is matched with rule R7.

Example embodiments described herein build a decision tree data structure by carefully preprocessing a classifier. Each time a packet arrives, the runtime walker traverses the decision tree data structure to find a leaf node that stores a small number of rules. Once the leaf node is reached, a linear search of the rules within the leaf node occurs to find a matching rule.

During building of the decision tree data structure, embodiments described herein determine the shape and depth of the decision tree data structure.

Figure 3B:
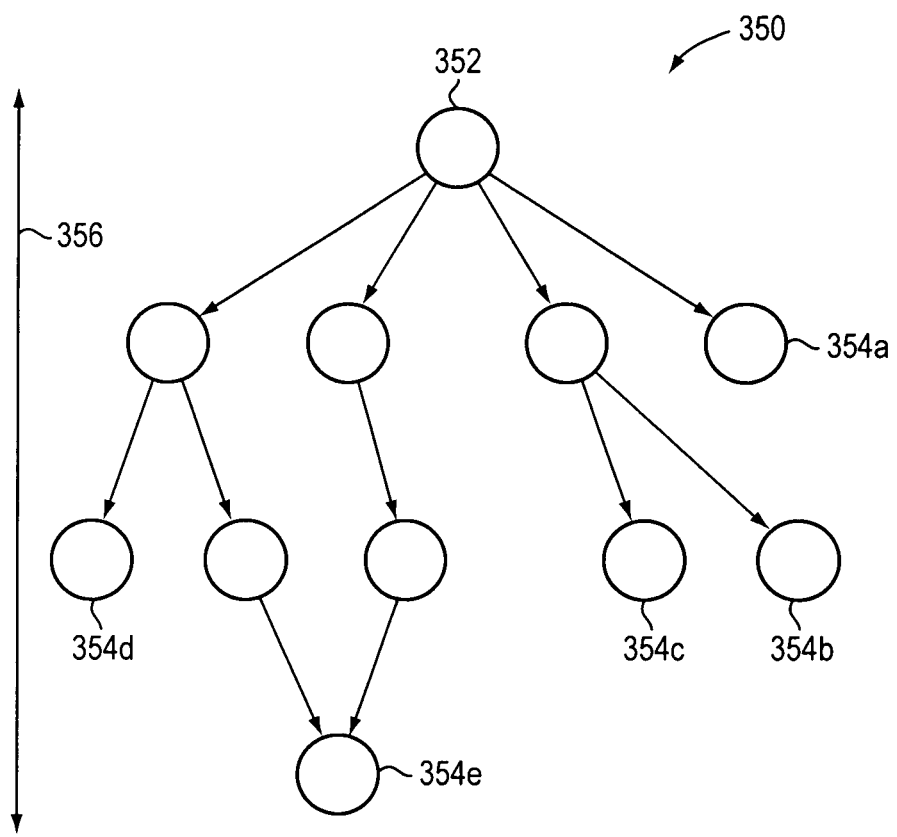
FIG. 3B illustrates depth of a decision tree data structure.

FIG. 3B illustrates a decision tree data structure 350 that includes a root node 352, and leaf nodes 354a-e, and has a depth 356.

Figure 3C:
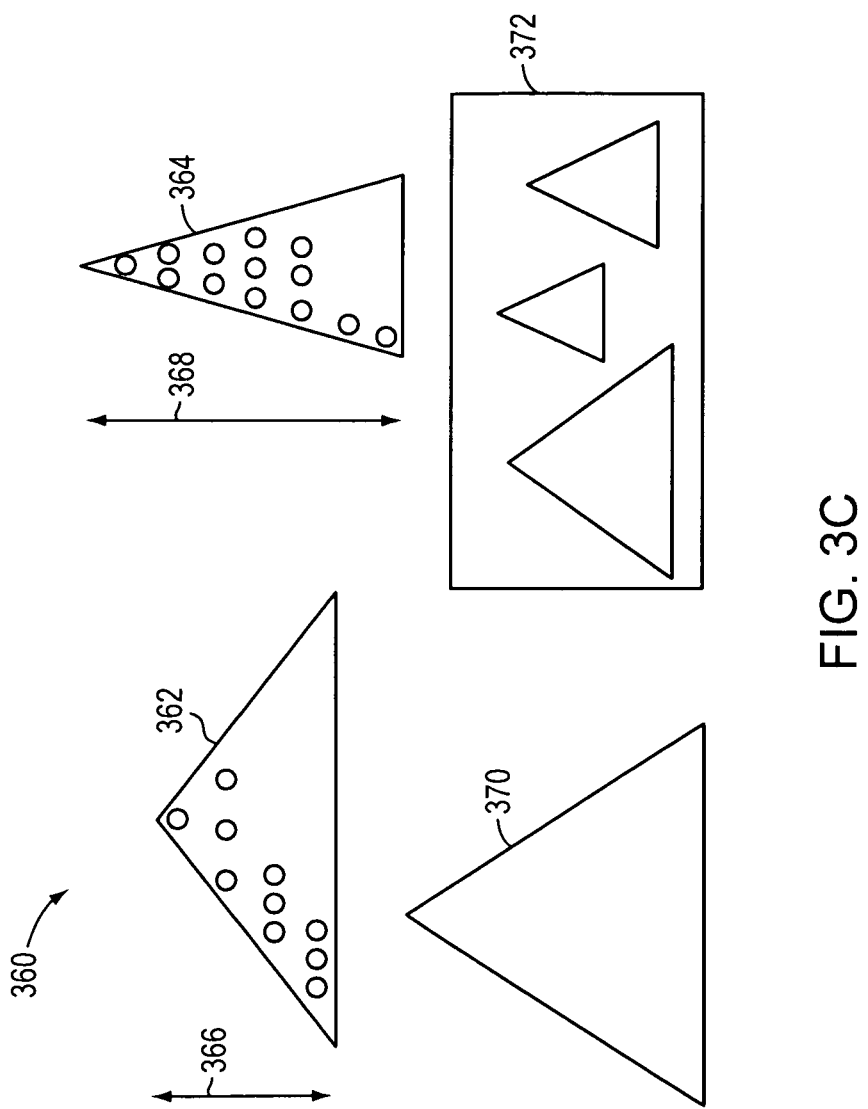
FIG. 3C illustrates depth and shape of decision tree data structures.

FIG. 3C illustrates depth and shape of decision tree data structures (360). For example tree data structure 362 has a depth 366 that is shallow in comparison to the depth 368 of decision tree data structure 364. The number of subtrees in the decision tree data structure may alter the shape of the decision tree data structure, for example a single subtree 370 versus a group of subtrees 372.

In addition, embodiments described herein determine which field to cut at a node of the decision tree and the number of cuts to make on the field to create child nodes based on the field cut and the number of cuts made on the field.

Figure 4:
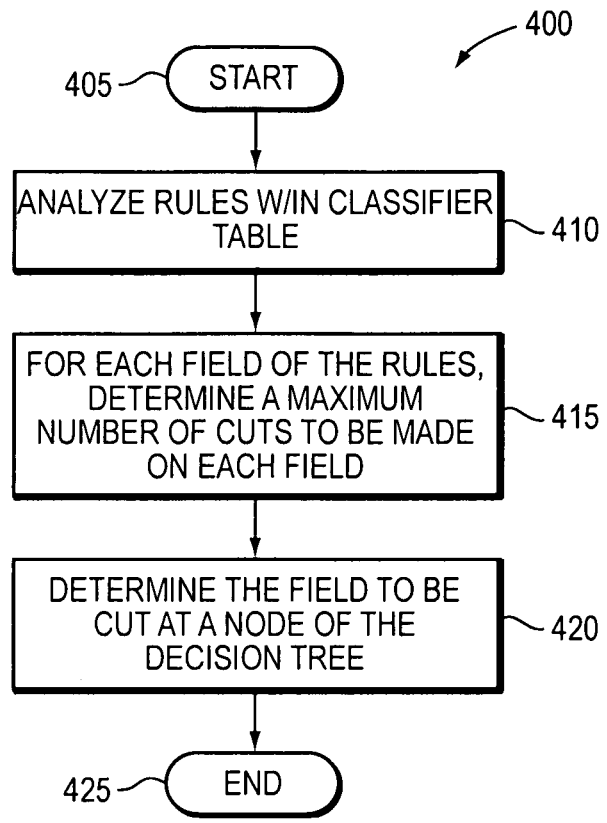
FIG. 4 is a flow diagram of a method for building a decision tree.

FIG. 4 is a flow diagram of a method 400 for building a decision tree. The method begins (405). The method analyzes a classifier table including rules for classifying a packet (410). As stated above, each rule in the classifier table has 'F' fields. The method analyzes the classifier table to determine a number of rules and a number of fields associated with each rule. Based on the analysis, at 415, the method determines a maximum number of cuts that can be made on each field 'F' of the rules. For example, a maximum number of cuts may be based on a given storage capacity. The method, for each node of the decision tree, may determine the field 'F' on which to cut the node to create child nodes (420), then the method ends (425). Determining the number of cuts that can be made on each field 'F' may balance efficiency and memory requirements. A large number of cuts on a field may decrease a decision tree's depth, accelerating query time; however, too large a number of cuts increases storage demand.

Figure 5:
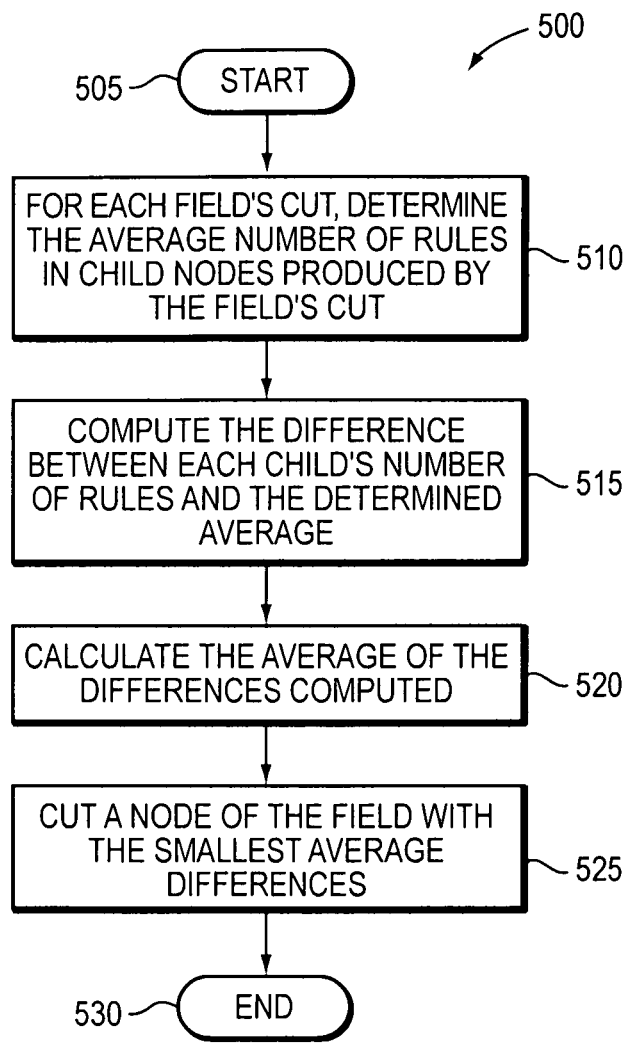
FIG. 5 is a flow diagram of a method for determining a field on which to cut a node.

FIG. 5 illustrates a flow diagram of a method 500 for determining a field on which to cut a node. By computing, for each field's cut, an average number of rules in the children produced by that cut, the difference between each child's actual number of rules and the average may be computed, and those differences may then be averaged, such that the field with the smallest such difference average may be selected. A tree that is shallower on average may be built, resulting in a shorter search time.

The method begins (505) and, based on the determined number of cuts to be made on each field (415 of method 400), determines an average number of rules in child nodes produced by cutting each field (510). The method computes a difference between an actual number of rules in each child node and the determined average number of rules in each child node (515). The method computes the average of the differences computed (520). The method cuts a node of the decision tree on the field with the smallest average difference (525).

Methods 400 and 500 are iterated on each node of the decision tree, until leaf nodes are created having no more than a given number of rules. The given number is adjustable. Methods 400 and 500 begin building a decision tree by starting with a root node that represents a complete rule list. Using method 400, a determination is made as to the number of cuts to be made on each dimension (field).

Once a determination is made as to the number of cuts to be made on each dimension, method 500 is used to determine which dimension to cut the root node of the decision tree. The cut on the root node causes child nodes to be created. Methods 400 and 500 are repeated on each child node until the only nodes remaining are leaf nodes (e.g., a node where no additional cuts can be made based on the number of rules in the child node and a given adjustable threshold number of rules for the child node). In other words, local decisions are taken at each node which results in the overall decision tree.

Figure 6:
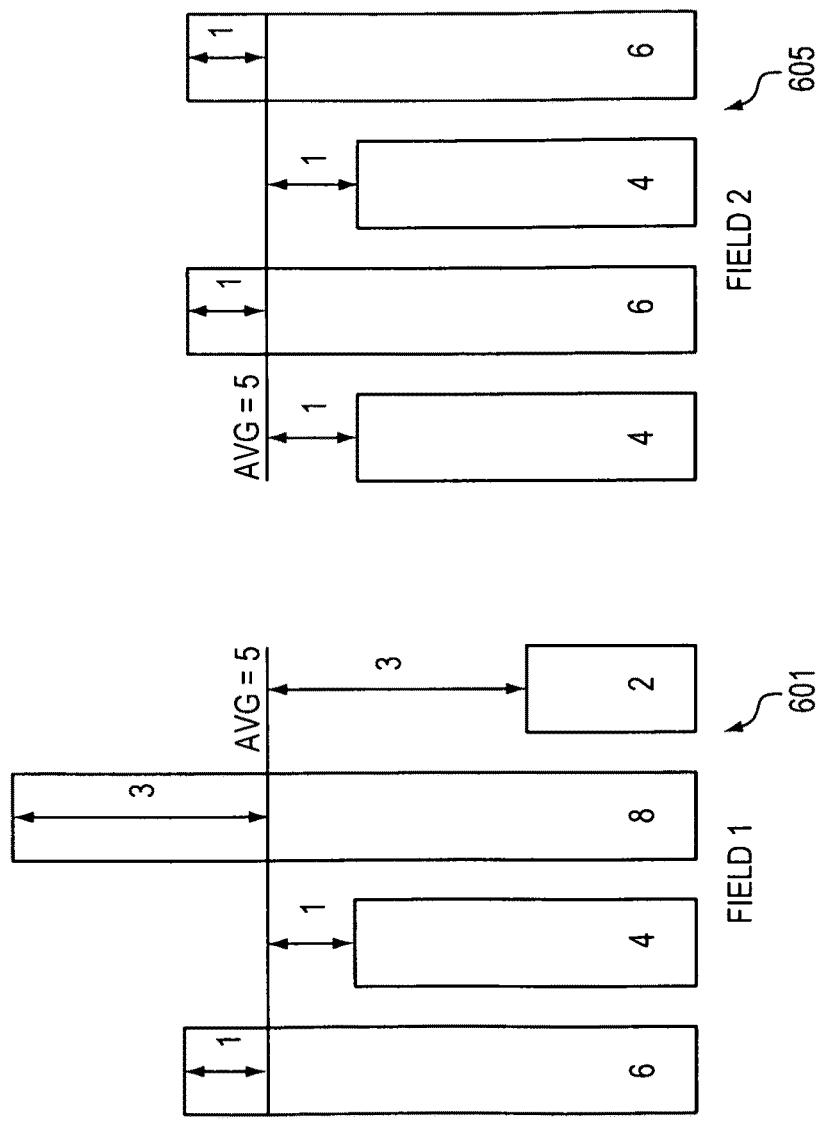
FIG. 6 is a diagram illustrating cuts made to fields of rules in a classification table.

FIG. 6 is a diagram illustrating cuts made to fields of rules in a classification table. Field-1 601 of a classifier table has been cut into 4 children, with each child containing 6, 4, 8, and 2 rules respectively. Field-2 605 of a classifier table has also been cut into 4 children containing 4, 6, 4, and 6 rules respectively. Referring to 510 of method 500, an average number of rules in child nodes by cutting each field are determined. As illustrated in FIG. 6, the average number of rules in both Field-1 and Field-2 per child node is 5 rules. Further, FIG. 6 illustrates the computed difference between the actual number of rules in each child node and the average difference, corresponding to 515 of method 500. The average of the calculated differences is then computed. For Field-1 601 the average difference is 2, while the average difference for Field-2 605 is 1. Thus, referring to 525 of method 500, a node is cut on Field-2 605 because the average difference is less than the average difference calculated for Field-1.

Once a cut for a node has been chosen, embodiments described herein determine whether to merge cuts made by a node's children. Merging entails grouping a parent node and the parent node's children into a single node. For example, if child nodes are cut on fields different than the parent node, the result would be a parent node that cuts on multiple fields.

In addition, child nodes that cut on the same field as the parent node may also be merged with the parent node by relaxing a space limit. The node resulting from the merge may have up to the absolute maximum number of children; for example, it is not constrained by a heuristic such as a maximum-space formula.

For example, a rule set (e.g., classifier table) may contain rules with 3 tuples or fields, F1, F2 and F3. In this example, a root node (N0) may cut on F1 and a number of cuts may be four. For example, 2 bits of F1 may be taken to decide a cut identifier. The result may be that the root node has 4 children, for example, N1, N2, N3 and N4. If N1 is cut on F1 and has 4 cuts, for example, 2 bits of F1 are taken to decide the cut identifier, N1 would have 4 children, for example, N11, N12, N13, N14. If N2 is cut on F2 and has 4 cuts, for example, 2 bits of F2 are taken to decide a cut identifier, N2 will have 4 children, for example, N21, N22, N23, N24. If N3 is cut on F1 and has 4 cuts, for example 2 bits of F1 are taken to decide the cut identifier, N3 will have 4 children, for example N31, N32, N33, N34. If N4 is cut on F3 and has 4 cuts, for example 2 bits of F3 are taken to decide the cut identifier; N4 would have 4 children, for example, N41, N42, N43, N44. The example describes that N0 may be cut on 3 fields, for example F1, F2 and F3 and the total cuts would be 256. The 4 bits of F1, 2 bits of F2 and 2 bits of F3 may be combined as 8 bits to cut N0, resulting in 256 children. A lesser number of levels is provided as there are only 2 levels as compared to the earlier 3 levels. The layer of N1, N2, N3, N4 has been removed, and the root node N0 and has its 256 children. A result in this example is that a total number of nodes in the tree is 257, as compared to 21 in original tree before merging. A balance is made between storage and performance tradeoff. For example, levels of the tree may be reduced at the expense of more nodes in tree.

Figure 7:
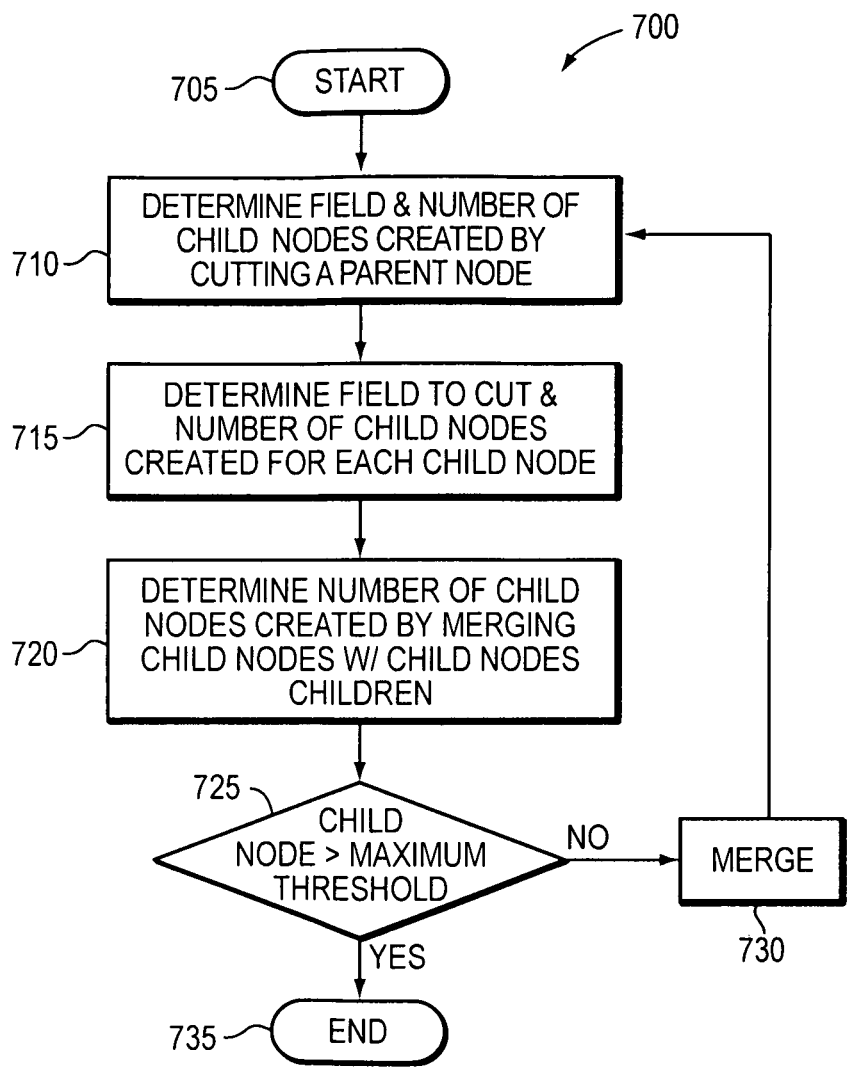
FIG. 7 is a flow diagram of a method for merging nodes of a decision tree.

FIG. 7 is a flow diagram of a method 700 for merging nodes of a decision tree. The method begins (705) and determines the field and number of child nodes to be created for the original node (e.g., a parent node) (710). The method makes a similar determination for each of the child nodes (715). The method determines the number of child nodes that results from a merge (720). The method determines if the resulting number of child nodes is within a predetermined maximum number of child nodes (725). If not, the method ends (735). If so, the method merges the nodes (730). Method 700 iterates for new sets of child nodes until merging is no longer possible. The predetermined maximum may be adjusted at each iteration. As a result, trees may be built that are wider and shallower, resulting in shorter search times.

Figure 8A:
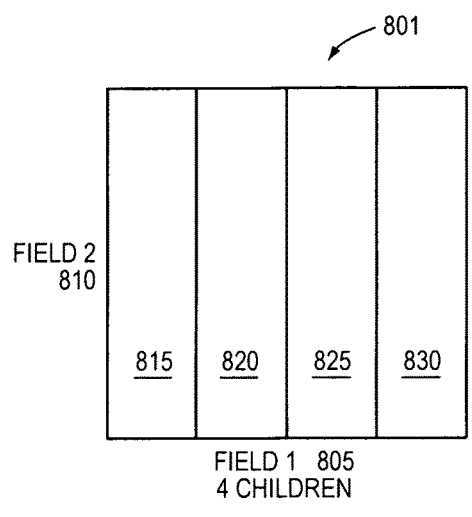
FIGS. 8A-C a show graphical examples of merging nodes.
Figure 8B:
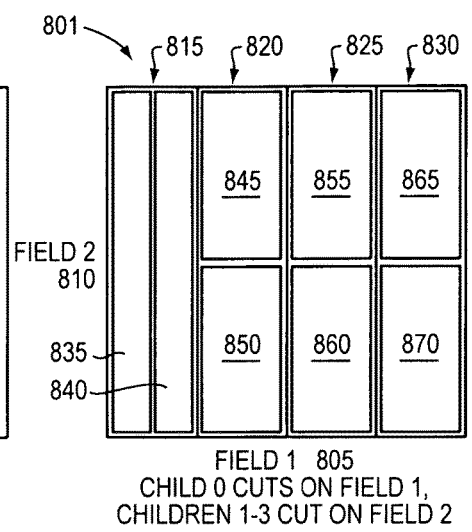
Figure 8C:
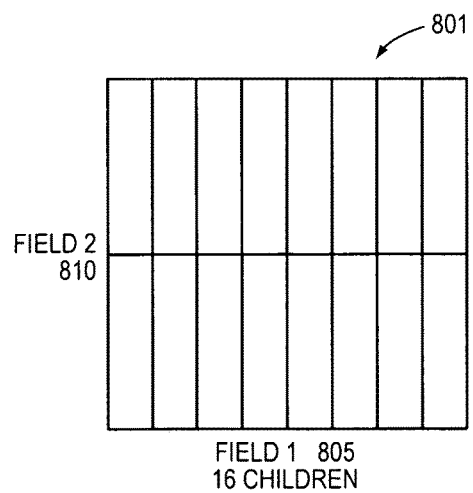

FIGS. 8A-C graphical examples of merging nodes. FIG. 8A is a graphical example of cuts made on fields of rules in a classifier table on a single node 801. For example, FIG. 8A illustrates a single node 801 that has rules having only two fields Field-1 805 and Field-2 810. Node 801 has been subdivided (e.g., cut) into four child nodes 815, 820, 825, and 830, as represented by the subdivisions of Field-1 805.

FIG. 8B illustrates the cuts made on the child nodes 815, 820, 825, 830 of node 801. For example, child node 815 has been cut on Field-1 805 creating child nodes 835 and 840. Child nodes 820, 825, and 830 have been cut on Field-2 810 creating child nodes 845-870.

FIG. 8C illustrates the merging of child nodes 815-830 and 835-870. As illustrated, root node 801 is now cut on both Field-1 805 and Field-2 810 creating 16 child nodes.

Sometimes, even when a node is cut into the maximum number of children, only one child has any rules, because all the node's rules are clustered into one small area of a search space.

Figure 9A:
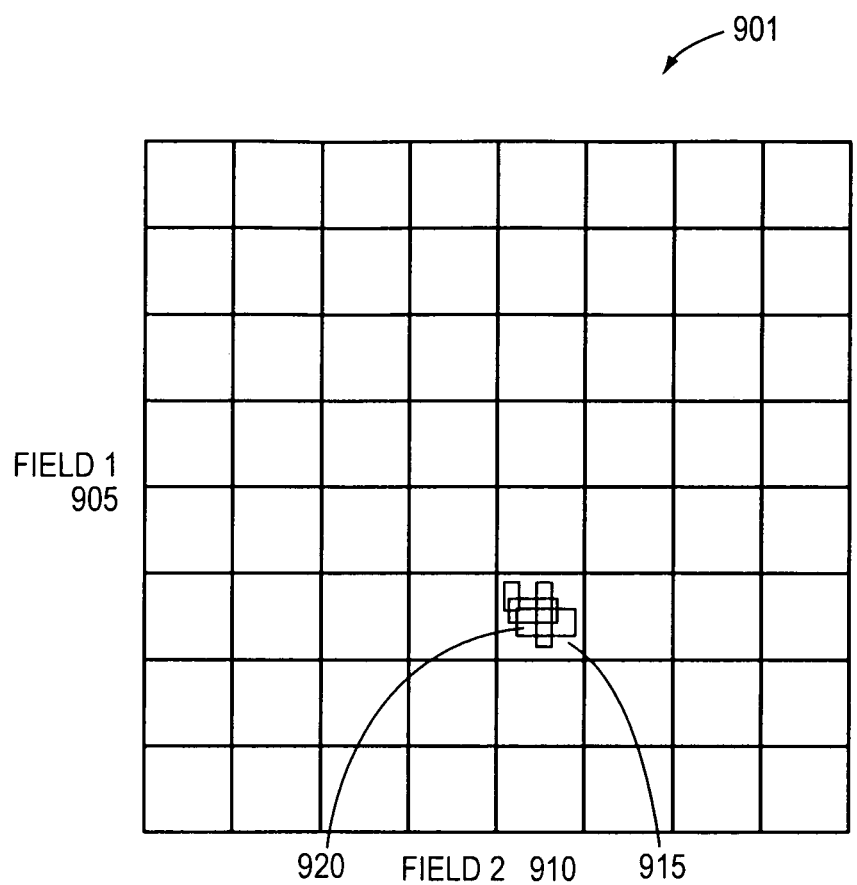
FIG. 9A shows a graphical example of a node cut resulting in a child node having all the rules of a classifier table.

FIG. 9A shows a graphical example of a node 901 that has been cut resulting in a child node 915 having all the rules 920 of a classifier table. Even after cutting both Field-1 905 and Field-2 910 by a factor of 8, into a total of 64 children, all of the node's original rules are inherited by a single child node 915. A runtime walker may be used to traverse a received packet through the decision tree data structure to obtain a matching rule. In this case, the runtime walker may have to spend time traversing this node, but does not achieve any subdivision of the search space. A key, such as data extracted from header tuples of the packet, may be used by the runtime walker for matching against rules. In this case, the only thing the runtime walker achieves is consuming the next few bits of the key in order to get down to the bits that can be used to choose among the rules. Embodiments herein may store, at each node, a number of bits a runtime walker should skip over as well as the number (identifier) of the field whose bits are to be skipped, when the walker traverses the node. As a result, the number of tree nodes that a runtime walker must traverse may be reduced, resulting in shorter search times.

Embodiments described herein include at least three data structures that include: i) a tree, ii) buckets, and ii) a rule table. A tree includes nodes and leaf nodes. Leaf nodes may be linked to buckets. The leaf nodes may point to buckets, buckets may contain a set of rules. Embodiments described herein may store rules in common tables and the buckets pointed to by leaf nodes may contain rule numbers corresponding to the rules in the rules table. Buckets may include rules in any suitable manner as may be known to one skilled in the art. Each bucket may be a data structure that may include one or more bucket entries. A bucket entry may be a rule, an index to a rule, a pointer to a rule, a pointer to a set of rules, or a pointer to another bucket. A bucket may include a linked list to the rules. A bucket may include entries including any combination thereof. For example, a bucket may have one entry that is a pointer to a rule and one entry that is a pointer to a set of rules, etc. Rule priority may be stored with a rule or linked to a rule in any suitable manner.

Figure 9B:
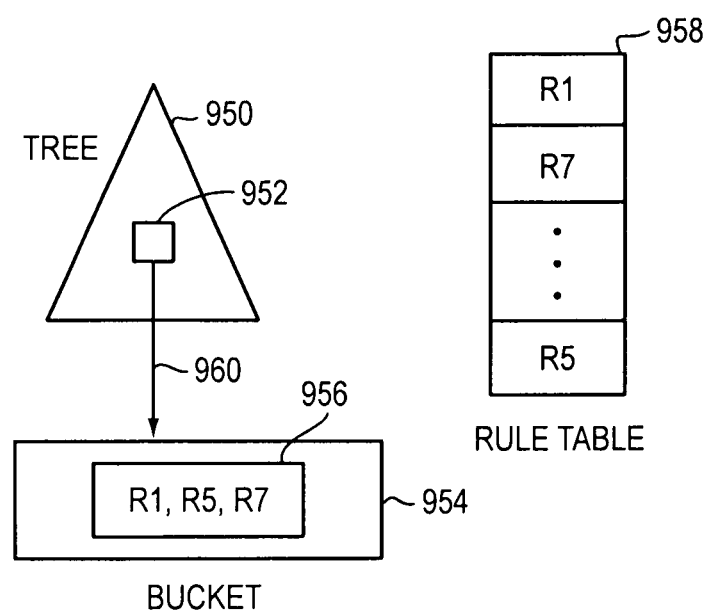
FIG. 9B is an illustration of a tree, a leaf node pointing to a bucket containing a set of rules of a classifier rule table.

FIG. 9B is an illustration of an example embodiment of a tree 950, a leaf node 952 pointing to (960) a bucket 954 containing a set of rules 956 of a classifier rule table 958.

Figure 9D:
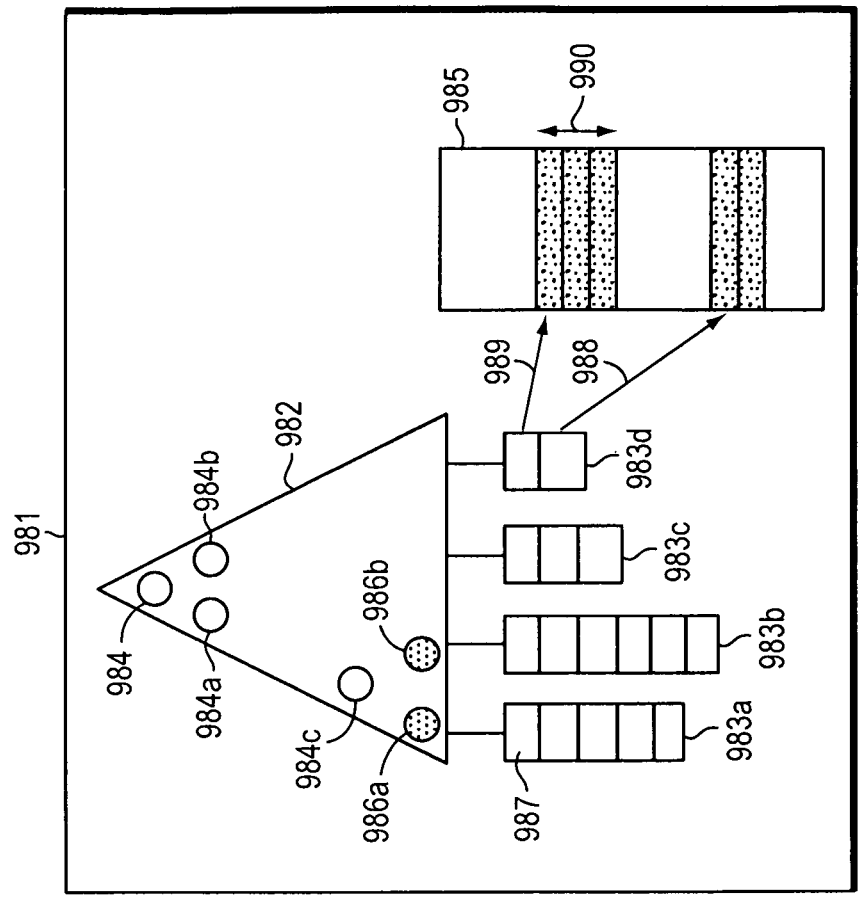
FIG. 9D illustrates a decision tree data structure including a tree, buckets, and rules.
Figure 9C:
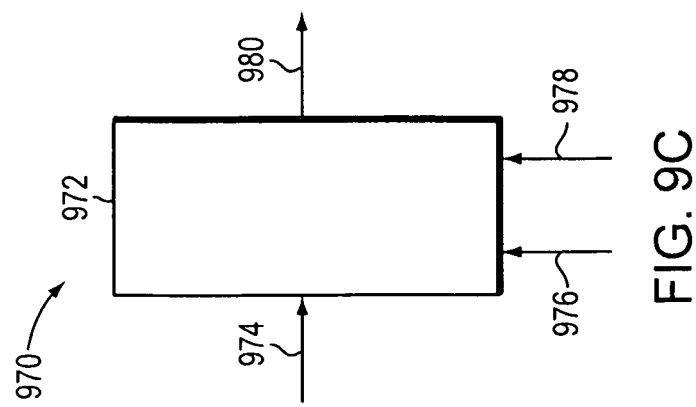
FIG. 9C is a block diagram illustrating an example embodiment of compiling a set of rules into a decision tree data structure.

FIG. 9C is a block diagram 970 illustrating an example embodiment of compiling a set of rules into a decision tree data structure. A software compiler 972 may receive a rule set 974, a maximum tree depth 976 and a number of subtrees 978. The software compiler 972 may generate a set of compiled rules 980.

FIG. 9D illustrates a decision tree data structure 981 including a tree, buckets, and rules. The set of compiled rules 980 may generate a decision tree data structure 981 including a tree 982, buckets 983*a-d*, and rules 985. The tree 982 may include a root node 984, nodes 984*a-c*, and leaf nodes 986*a-b*. Each leaf node 986 of the tree 982 points to a bucket 983. Each bucket may include one or more bucket entries 987. A leaf node may include bucket information that may be used to locate the bucket entries or a bucket list of entries. A bucket entry may be a pointer to rule (988), or a pointer (989) to a set of rules (990). The set of rules 990 may be a sequential group of rules, or a group of rules scattered throughout the memory, either organized by a plurality of pointers or by a method used to recollect the set of rules. The set of rules 990 may also be called a chunk, or a chunk of rules. A bucket entry that points to the set of rules 990 may be called a chunk pointer.

Embodiments described herein identify i) bucket duplication, ii) rule duplication, iii) node duplication, and iv) priority duplication. Once a decision tree is built, it may be determined that some leaf nodes point to buckets containing the same rules (e.g., duplicate rules) or some may point to buckets containing a partial duplicate. Embodiments described herein identify duplication of data and determine how to reuse or share the duplicated data so that there is only a single instance of the duplicated data.

Embodiments described herein may remove duplicate buckets keeping only a single copy. For example, in some scenarios different leaf nodes may have buckets that contain the same rules. In such a situation, a single bucket is stored and all the leaf nodes point to the same bucket. Thus, the memory required to hold a given tree may be reduced.

In some scenarios, when a parent node is cut to generate child nodes, some of the child nodes inherit the same rule sets. This is called node duplication. For example, if a parent node has 100 rules starting from rule R1 to rule R100 and the parent node is cut into 64 children, several of the 64 child nodes may inherit the same rules. Embodiments described herein may identify the child nodes that contain the same rule set, and only process one of the nodes having the same rules.

Figure 10A:
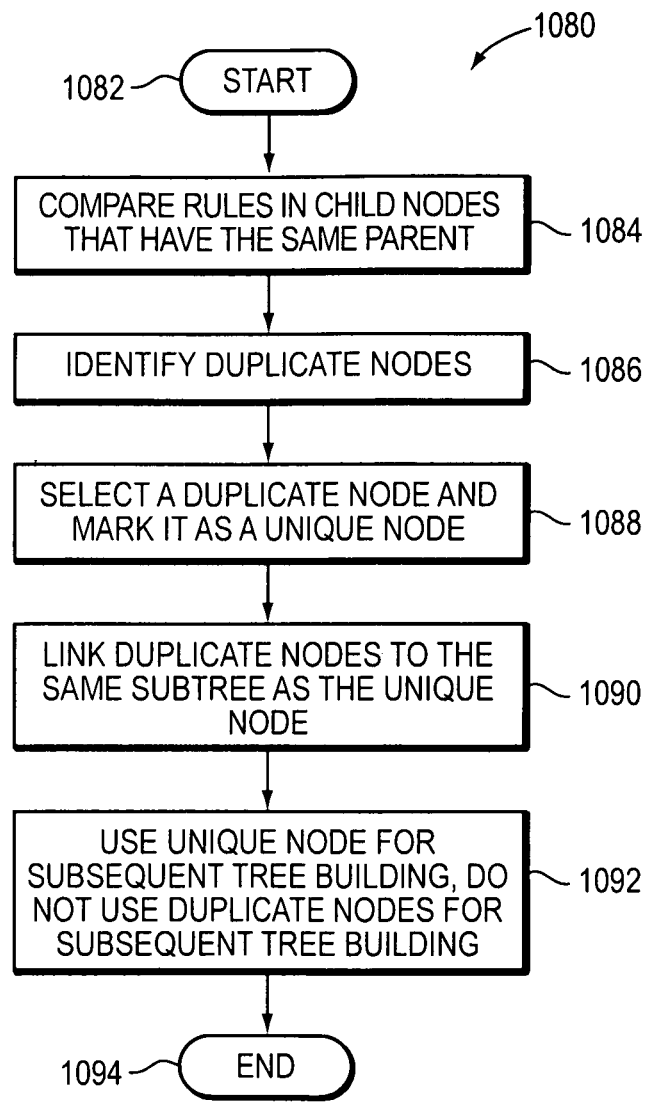
FIG. 10A is a flow diagram that illustrates a method identifying the child nodes that contain the same rule set.

FIG. 10A is a flow diagram that illustrates a method (1080) identifying the child nodes that contain the same rule set. The method begins (1082) and compares a subset of rules represented by child nodes having a same parent node (1084). Child nodes having the same parent may be called siblings. Child nodes of the same parent that contain the same rule set are identified as of duplicate child nodes (1086). One child node of the set of duplicate child nodes may be selected (marked) as a unique child node (1088). The other duplicate child nodes of the set of duplicate child nodes may be linked to the same subtree as the unique child node (1090). The unique child node may be used for subsequent building of the decision tree data structure, and the other child nodes of the set of duplicate child nodes may not be used for subsequent building of the decision tree data structure (1092) and the method ends (1094).

As stated above, packet classification may result in the matching of more than one rule from the rule classification table. A rule having a highest priority is chosen for classifying a received packet. Embodiments described herein may determine priority of rules for overlapping rules. Rather than storing a unique priority for each rule in a rule classification table, which is resource intensive and requires a great amount of storage space, embodiments described herein may categorize rules based on overlapping criteria. Rules may be categorized into priority groups and rules within each priority group may be assigned a unique priority. Rules within priority groups compete for a match. By assigning unique priority within a priority group, competing rules are prioritized. However, the priorities are only unique within the priority group, thus the same priority values may be shared with rules that do not compete, thereby reducing the total number of priority values needed. Priority duplication saves storage space by providing a priority value on a per overlapping criteria basis instead of requiring a unique priority value to be stored for each rule.

Figure 10B:
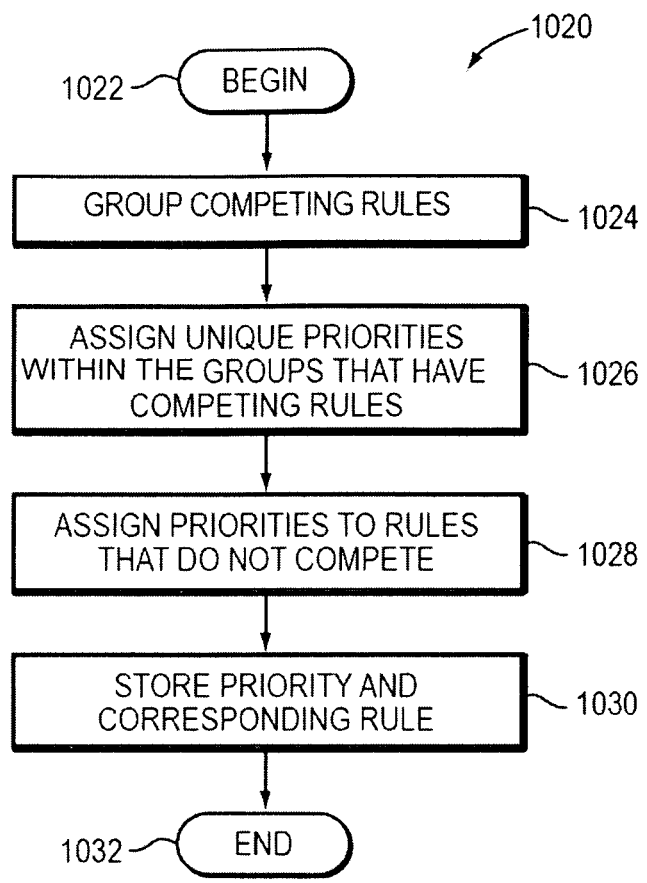
FIG. 10B is a flow diagram of a method for priority duplication.

FIG. 10B is a flow diagram of a method for priority duplication (1020). The method begins (1022) and groups rules based on whether or not the rules compete (1024). Priority values may be assigned to the plurality of rules. Unique priority values may be assigned within each group of competing rules (1026). Non-competing rules may be assigned a priority, the priority assigned to non-competing rules may overlap with the unique priorities assigned within the groups of competing rules (1028). The storing decision tree data structure may store the plurality of rules and the priority value assigned (1030) and the method ends (1032).

Figure 10C:
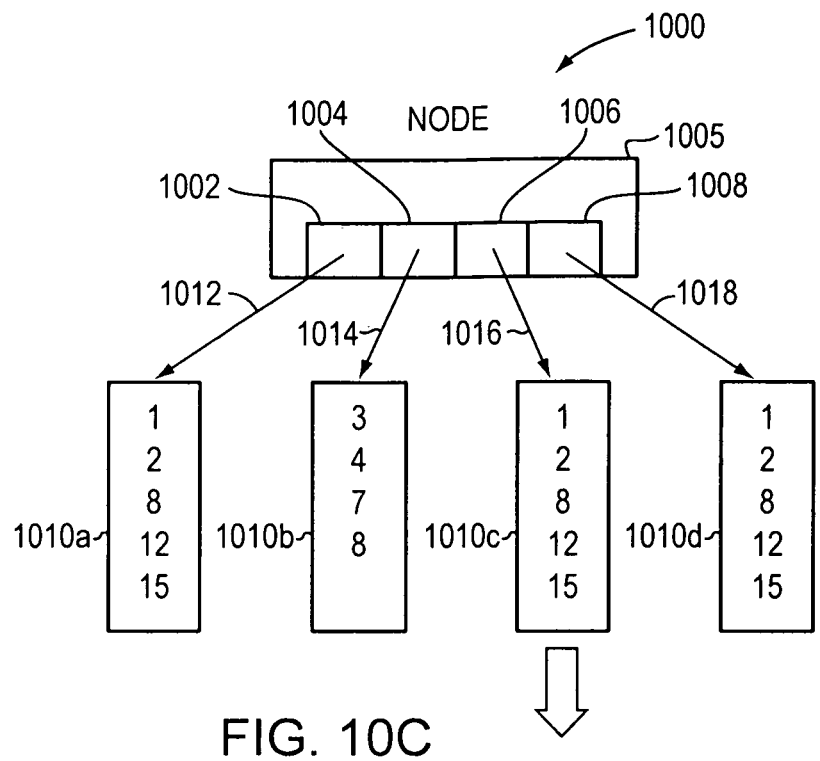
FIGS. 10C-D illustrate graphical examples of removing duplicate buckets of rules in a node of a decision tree.

FIG. 10C illustrates a graphical example of removing duplicate buckets of rules in a node of a decision tree (1000). As illustrated, a node 1005 has 4 leaf nodes 1002, 1004, 1006, and 1008. The node 1005 shows 4 buckets 1010a-d containing a set of rules, the buckets 1010a-d are pointed to (1012, 1014, 1016, 1018) by leaf nodes 1002, 1004, 1006, and 1008, respectively. Buckets 1010a, 1010c, and 1010d all contain the same rules. Because the buckets 1010a, 1010c, and 1010d are identified to contain the same rules, and the duplicate buckets 1010c and 1010d may be removed from memory, keeping only unique buckets 1010a and 1010b.

Figure 10D:
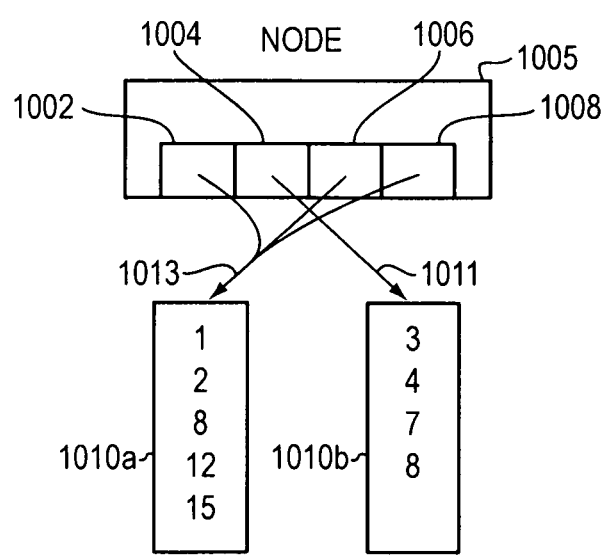

FIG. 10D shows node 1005 results in having two buckets (1010a and 1010b) containing rules that need to be stored in memory. Thus, the leaf nodes 1002, 1004, 1006, and 1008 of node 1005 only need to point to a memory location containing the set of rules in buckets 1010a and 1010b. For example, leaf nodes 1002, 1006, and 1008 all point (1013) to bucket 1010a, and leaf node 1004 points (1011) to bucket 1010b.

Figure 10E:
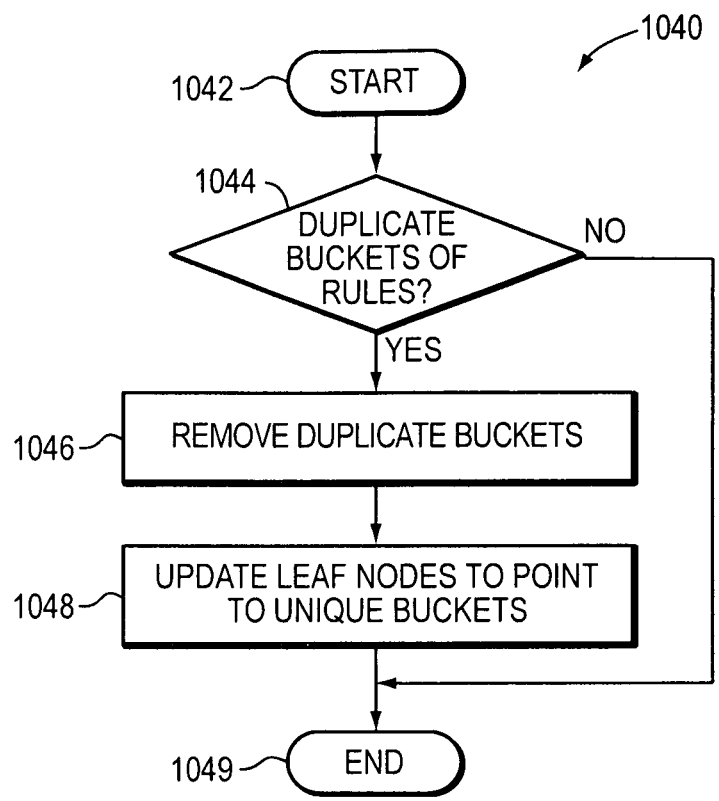
FIG. 10E illustrates a method for removing duplicate buckets of rules in a node of a decision tree.

FIG. 10E is a flow diagram of a method for removing duplicate buckets of rules in a node of a decision tree (1040). Method 1040 starts 1042 and identifies duplicate buckets of rules (1044). If duplicate buckets of rules are not identified, the method ends (1049). If duplicate buckets of rules are identified, duplicate buckets are removed (1046) and leaf nodes are updated to point to unique buckets (1048) and the method ends (1049).

Bucket duplication is not limited to child nodes having a same parent (e.g., siblings).

Figure 10F:
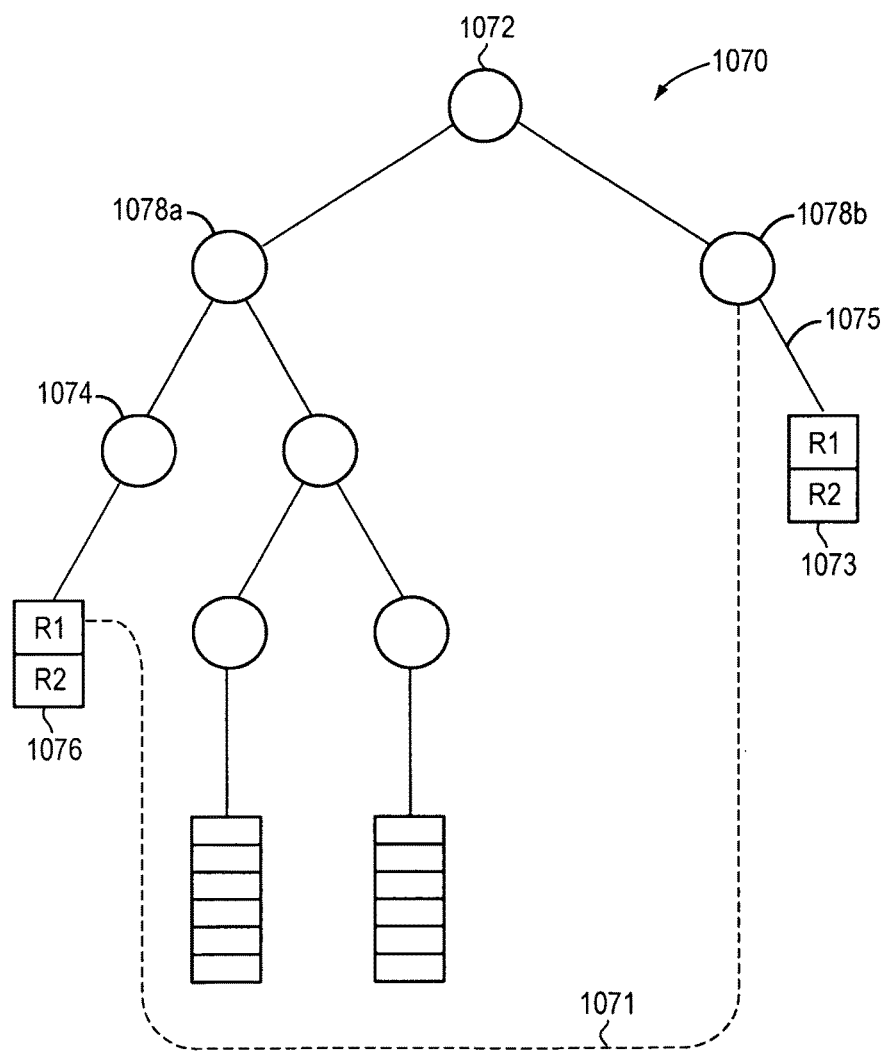
FIG. 10F illustrates a graphical example of removing duplicate buckets of rules from non-sibling nodes of a decision tree.

FIG. 10F is a graphical illustration of bucket duplication according to one embodiment. A portion of a tree (1070) is shown that includes a parent node 1072 that has child nodes 1078a and 1078b (leaf) and a grandchild node 1074. The child node 1078b (leaf) and grandchild node 1074 (leaf) both point to buckets 1073 and 1076 respectively. The buckets 1076 and 1073 are duplicate buckets each including a duplicate rule set (e.g., R1 and R2). The bucket 1073 may be removed by pointing the child node 1078b to point 1071 to the bucket 1076 pointed to by the grandchild node 1074.

Figure 10G:
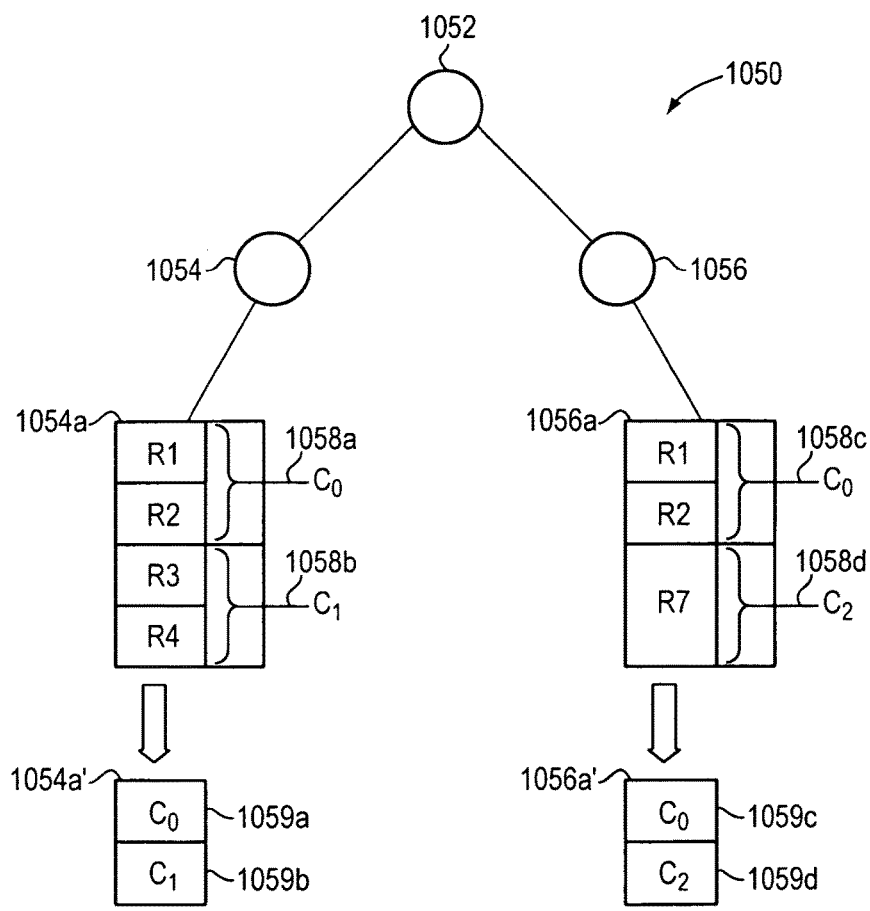
FIG. 10G illustrates a graphical example of removing partial duplicate buckets of rules in a node of a decision tree.

FIG. 10G is a graphical illustration of partial duplicate buckets of rules in a node of a decision tree. A portion of a tree (1050) is shown including a parent node 1052 and two children (leaves) 1054 and 1056 that point to buckets 1054a and 1056a respectively. Buckets 1054a and 1056a have a partial duplicate set of rules R1 and R2. The set of rules in each bucket may be split into subsets. For example, rules in the bucket 1054a may be split into a first set 1058a including R1 and R2 and a second set 1058b including R3 and R4. Rules in the bucket 1056a may be split into a first set 1058c including R1 and R2 and a second set 1058d including R7. The bucket entries may be replaced with a linked list of chunk pointers, or pointers to sets of rules. Bucket 1054a' illustrates bucket 1054a having bucket entries replace with a linked list of chunk pointers C0 and C1. Similarly, bucket 1056a' illustrates bucket 1056a having bucket entries replace with a linked list of chunk pointers C0 and C2. Chunk pointer C0 points to a set of rules including R1 and R2, chunk pointer C1 points to a set of rules including R3 and R4, and chunk pointer C2 points to a set of pointers including R7.

Figure 11A:
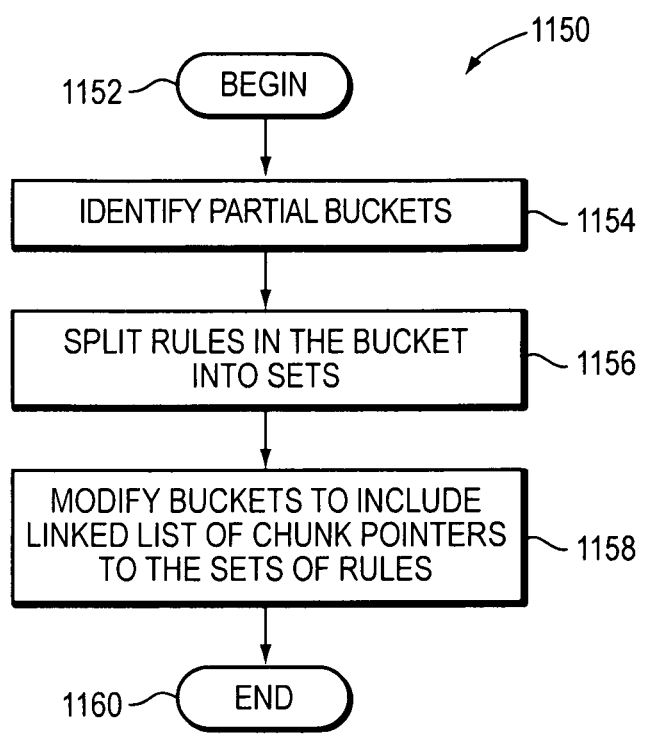
FIG. 11A is a flow diagram of a method for partial duplicate buckets of rules in a node of a decision tree.

FIG. 11A is a flow diagram of a method (1150) for partial duplicate buckets of rules in a node of a decision tree. The method begins (1152) and identifies a set of partial duplicate buckets (1154). Partial duplicate buckets each include a duplicate partial set of rules. The rules in each bucket are separated into a first and second set of rules. The first set of rules includes the duplicate partial set of rules and the second set of rules includes any remaining rules for the bucket (1156). Links (chunk pointers) are created to the first and second set of rules and the bucket is linked to the created links (1158) and the method ends (1160). Each partial duplicate bucket may be modified to store a linked list of the chunk pointers. The number of sets shown is an illustration, there could be multiple sets if there are multiple partial duplicates.

As stated above, rules may have multiple fields. Each field of the rule represents a field in a header of an incoming packet. Headers of packets generally include at least two fields, one field containing a source IP address field and a second field containing a destination IP address field. The rules may contain IP wildcards in either or both of the fields representing the source IP address field and destination IP address field of an incoming packet.

Embodiments described herein may separate rules into categories. The categories may be based on a function of the fields. The rules may be separated into categories in any suitable manner. The rules may be based on a function of the fields. For example, the rules may be categorized based on whether or not they have wildcards in the source and destination IP address fields. The categories may be as follows: 1) rules that do not have wildcards in either the source or destination fields, 2) rules that have wildcards in both the source and destination fields, 3) rules that have wildcards in the source field but not in the destination field, and 4) rules that have wildcards in the destination field but not in the source field. The fields may be any fields and any number of fields. For example, three fields may be used for categories, resulting in 8 categories. Also, instead of complete wild card, the category may be based on a field being "large" or "small." Large and small may be defined by a ratio of a range of a field value to its total space.

Figure 11B:
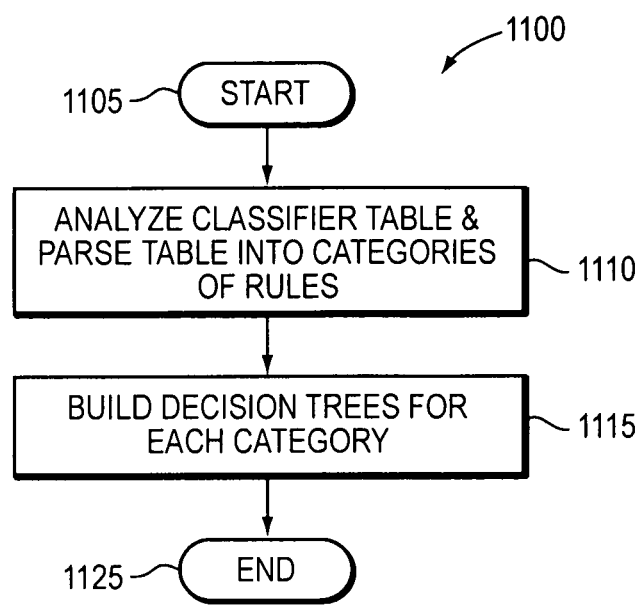
FIG. 11B illustrates a method for parsing a compiler table into categories of rules and building decision trees for each category.

FIG. 11B illustrates a method 1100 for parsing a classifier table into categories of rules and building decision trees for each category. Method 1100 begins at 1105 and then the method 1100 analyzes a classifier table and parses the table into categories of rules (1110). For each category of rules, the method 1100 builds a decision tree (1115), and the method ends (1125).

Figure 11C:
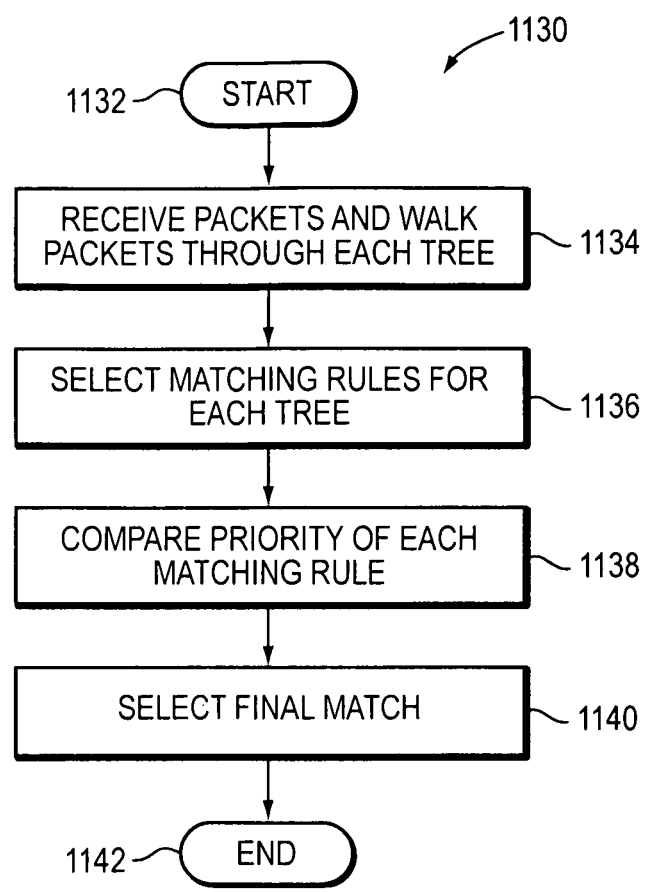
FIG. 11C illustrates a method for selecting a matching rule.

FIG. 11C illustrates a method 1130 for selecting a matching rule. Method 1130 begins at 1132. Received packets are walked by a runtime walker through each decision tree (1134). Each decision tree returns a matching rule if a matching rule is selected (1136). The priority of each matching rule is compared (1138) and a matching rule with the highest priority is selected (1140) and the method ends (1142).

Internet routers classify packets to implement a number of advanced internet services such as routing, rate limiting, access control in firewalls, virtual bandwidth allocation, policy-based routing, service differentiation, load balancing, traffic shaping, and traffic billing. These services require the router to classify incoming packets into different flows and then to perform appropriate actions depending on this classification.

Figure 12:
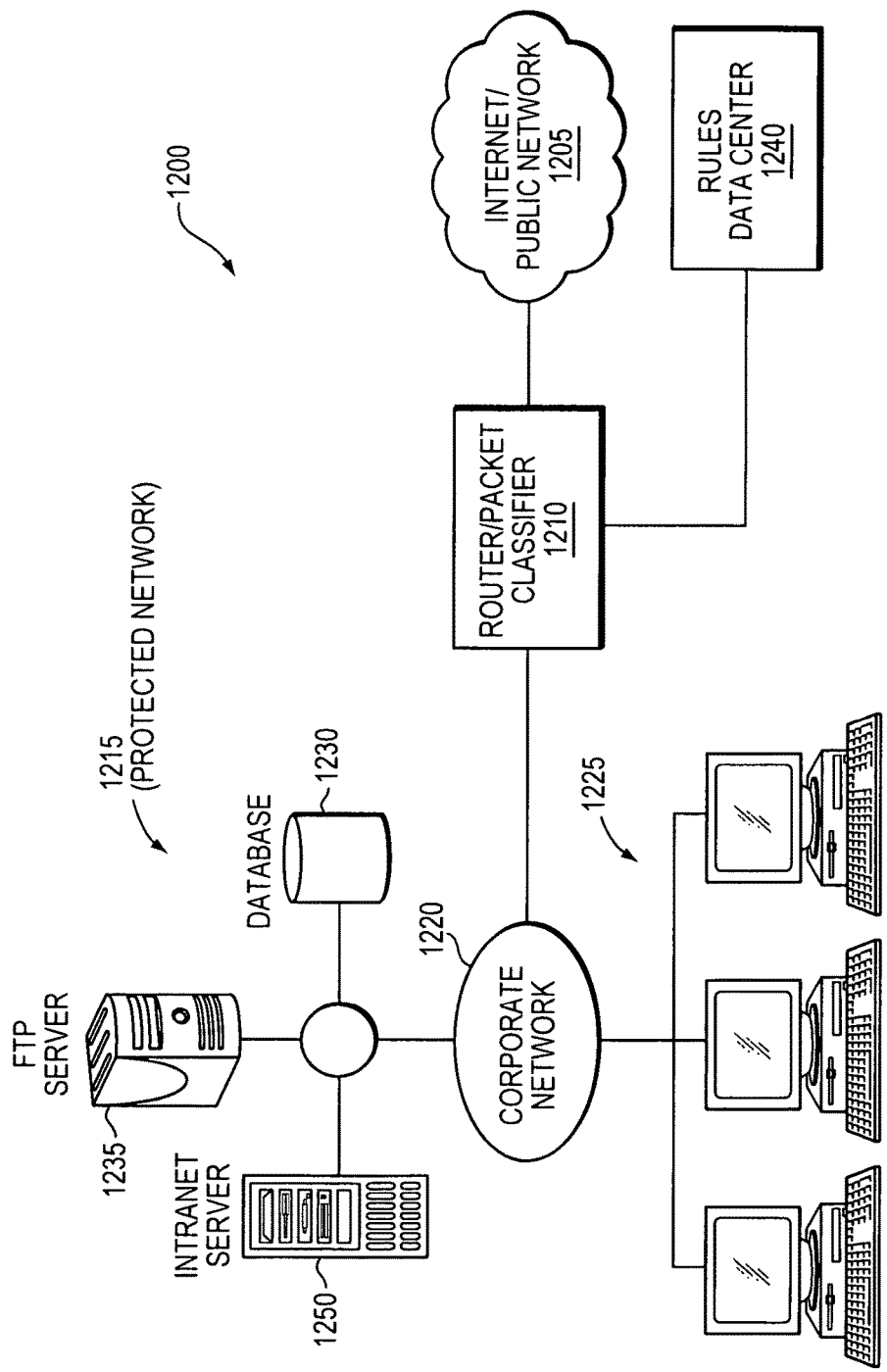
FIG. 12 is a block diagram illustrating a system in which a packet classifier operates to classify packets to provide internet services to a private network.

FIG. 12 is a block diagram illustrating a system 1200 that includes a router/packet classifier 1210, protected network 1215, and a public network 1205. The public network 1205 may comprise an unsecured wide-area network (WAN), such as the Internet, a wireless network, a local-area network, or another type of network. Protected network 1215 may comprise a secured computer network such as a local-area network (LAN) in an office or a data center. As illustrated, the LAN may be a corporate network 1220 including a plurality of work stations 1225. The plurality of work stations 1225 are operatively coupled to database 1230, FTP (file transfer protocol) server 1235, and intranet server 1250.

In system 1200, the router 1210 is connected to the public network 1205 and protected network 1215 such that network traffic flowing from public network 1205 to protected network 1215 flows first to the router 1210. The router 1210 may be a stand-alone network appliance, a component of another network appliance (e.g., firewall appliance), a software module that executes on a network appliance, or another configuration. The router 1210 may be connected to a rules datacenter 1240. In general, router 1210 inspects network traffic from public network 1205 and determines what actions to perform on the network traffic. For example, router 1210 classifies packets to implement a number of advanced internet services such as routing, rate limiting, access control in firewalls, virtual bandwidth allocation, policy-based routing, service differentiation, load balancing, traffic shaping, and traffic billing. These services require the router 1210 to classify incoming packets into different flows and then to perform appropriate actions depending on this classification.

Figure 13:
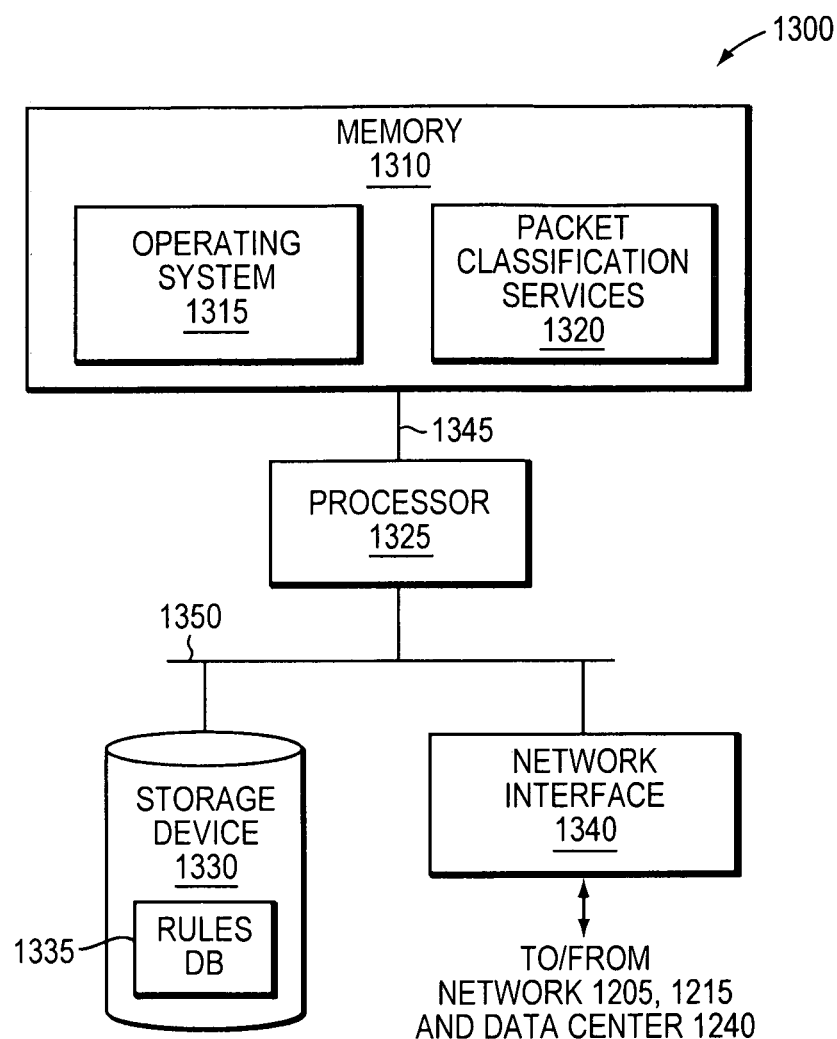
FIG. 13 is a block diagram of a router that may classify packets according to techniques disclosed herein.

FIG. 13 is a high-level block diagram of an exemplary router 1300 that may be used with embodiments described herein. Router 1300 comprises a memory 1310 coupled to a processor 1325 via a memory bus 1345 and, a storage device 1330 and a network interface 1340 coupled to the processor 1325 via an input/output (I/O) bus 1350. It should be noted that the router 1300 may include other devices, such as keyboards, display units and the like. The network interface 1340 interfaces the router 1300 with the secured network 1215, public network 1205, and rules datacenter 1240 and enables data (e.g., packets) to be transferred between the router and other nodes in the system 1200. To that end, network interface 1340 comprises conventional circuitry that incorporates signal, electrical and mechanical characteristics, and interchange circuits, needed to interface with the physical media of system 1200 and protocols running over that media.

The memory 1310 is a non-transitory computer-readable medium implemented as a RAM comprising RAM devices, such as DRAM devices and/or flash memory devices. Memory 1310 contains various software and data structures used by the processor 1325 including software and data structures that implement aspects of the embodiments described herein. Specifically, memory 1310 includes an operating system 1315 and packet classification services 1320. The operating system 1315 functionally organizes the router 1300 by invoking operations in support of software processes and services executing on router 1300, such as packet classification services 1320. Packet classification services 1320, as will be described below, comprises computer-executable instructions to compile a decision tree data structure from a given set of rules and walk incoming data packets through the compiled decision tree data structure.

Storage device 1330 is a conventional storage device (e.g., disk) that comprises rules database (DB) 1335 which is a data structure that is configured to hold various information used to compile a decision tree data structure from a given set of rules. Information may include rules having a plurality of fields corresponding to headers of incoming data packets.

Figure 14:
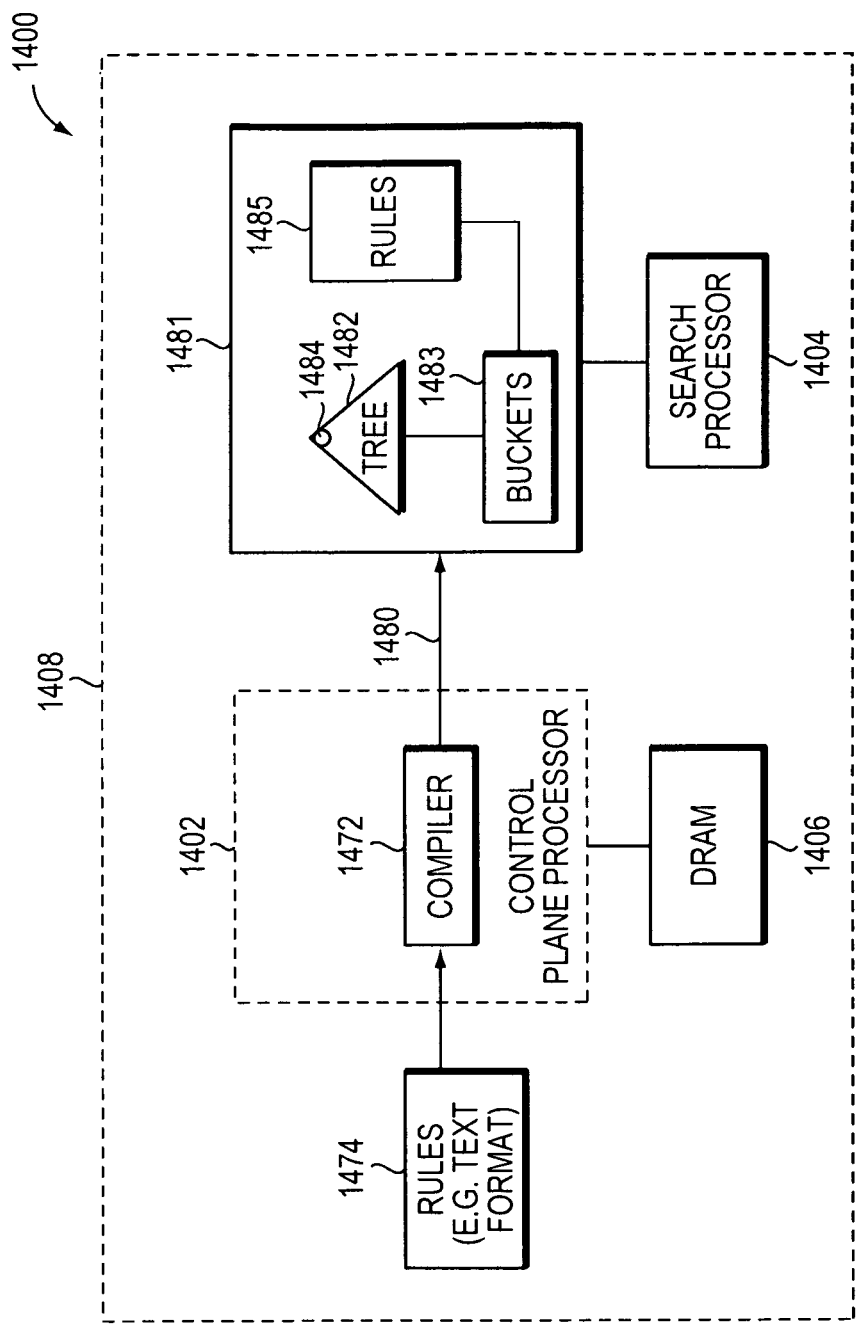
FIG. 14 is a block diagram of another example embodiment of compiling a set of rules into a decision tree data structure.

FIG. 14 is a block diagram 1400 of another example embodiment of compiling a set of rules into a decision tree data structure. A compiler 1472 may receive a rule set 1474 (e.g., a text file) and parse the rule set 1474 to generate a set of compiled rules 1480 for building a decision tree data structure 1481 including a tree 1482, buckets 1483, and rules 1485 as described above in reference to FIG. 9C and FIG. 9D. The tree 1482 may include a plurality of nodes, such as a root node 1484, and nodes (not shown) having a leaf-node type or a non-leaf node type. Nodes having a non-leaf node type may be referred to herein as nodes and nodes having a leaf-node type may be referred to herein as a leaf or a leaf node. The plurality of rules 1485 may represent a search space for packet classification.

The plurality of rules 1485 may have at least one field. The plurality of nodes may each cover a portion of the search space by representing successively smaller subsets of the plurality of rules with increasing depth in the tree 1482. The root node 1484 of the tree 1482 (also referred to herein as a search tree, decision tree, or Rule Compiled Data Structure) may cover all values of the plurality of rules 1485 (also referred to herein as the search space, e.g., all possible values that may be matched by keys).

At some nodes, especially those lower in the decision tree data structure, all values matched by a particular rule may also be matched by a higher-priority rule. In this case the lower-priority rule will never be matched within the node and may be removed from it without causing a traffic interruption (e.g., packet loss, packet processing delay, etc.). A lower-priority rule that will never be matched within the node may be referred to herein as a covered rule or a redundant rule. Redundant rules are "useless" rules because they are not matched. Searching the decision tree data structure to identify and remove redundant rules (e.g., covered rules) is a compiler operation that may be referred to herein as removing redundant rules.

According to embodiments disclosed herein, redundant rules may be removed from a node and, thus, redundant rules that have been removed from the node are not carried forward in further subtrees of the node. A search for redundant rules at a node may include determining whether or not a given rule represented by the node is covered by one or more other higher priority rules represented by the node. The search for redundant rules at the node may include omitting the given rule from the node and other nodes cut from the node if the given rule is covered. The search for redundant rules at the node may include populating one or more cover lists for the one or more higher priority rules to include the given rule omitted, the one or more cover lists may each be associated with node. Embodiments disclosed herein may maintain one or more cover lists at each node of the decision tree data structure. The one or more cover lists may each be associated with a covering rule and may each list one or more rules covered by the covering rule.

Figure 15:
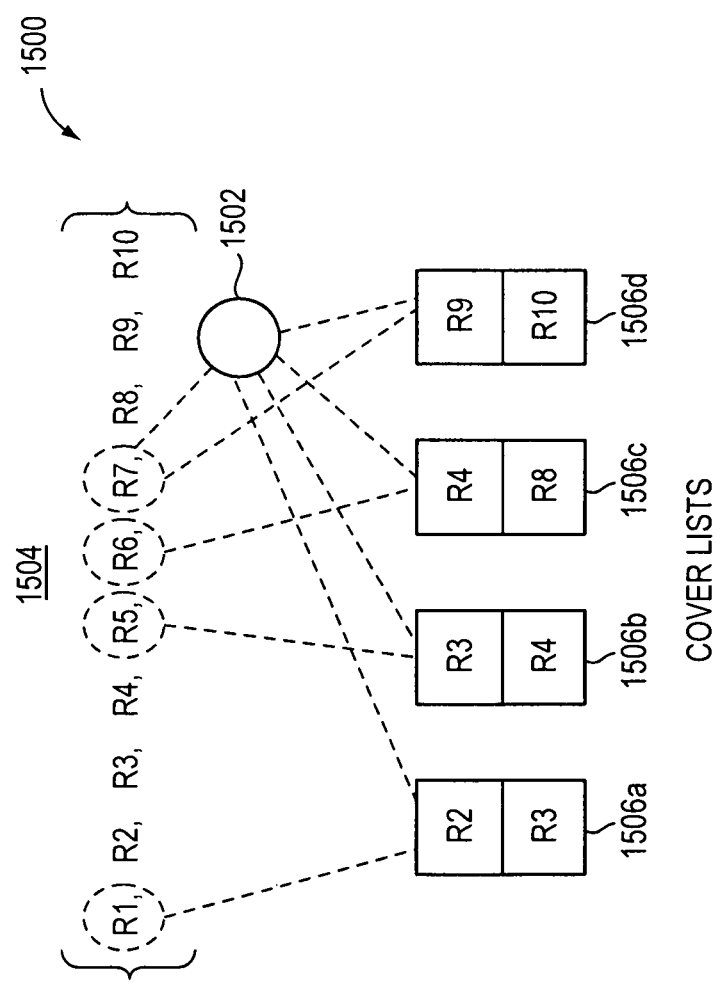
FIG. 15 is a block diagram of an embodiment of cover lists for rules of a node.

FIG. 15 is a block diagram 1500 of an embodiment of cover lists for rules of a node 1502. The node 1502 has a set of ten rules 1504, such as R1-R10, and four cover lists 1506a-d in the example embodiment. Out of the ten rules 1504, four of the rules are higher priority, such as R1, R5, R6, and R7 that cover the remaining rules R2, R3, R4, R8, R9, and R10 as follows. R1 covers R2 and R3, R5 covers R3 and R4, R6 covers R4 and R8, and R7 covers R9 and R10. As such, a cover list 1506a for the node 1502 associated with R1 includes R2 and R3, a cover list 1506b for the node 1502 associated with R5 includes R3 and R4, a cover list 1506c for the node 1502 associated with R6 includes R4 and R8, and a cover list 1506d for the node 1502 associated with R7 includes R9 and R10. According to embodiments disclosed herein, a compiler of a decision tree data structure may be made more efficient by avoiding compiler operations that may be unproductive and time consuming. An example of a time consuming operation is a search for redundant rules. A redundant rule may also be referred to herein as a covered rule.

In an embedded environment, the compiler 1472 of FIG. 14 may execute on a control plane processor 1402 and a search processor 1404 may perform packet classification and search for one or more rules of the plurality or rules in the decision tree data structure that match keys generated from received packets (not shown). The control plane processor 1402 that implements the compiler 1472 may be limited by a memory footprint, such as a small footprint typical of Dynamic Random Access Memory 1406 (DRAM) coupled to the control plane processor 1402. The control plane processor 1402 that implements the compiler 1472 may also be computationally limited due to speed of the processor and yet the compiler 1472 may be required to be a high performance compiler as the compiler 1472 may need to apply mission critical rule changes to the decision tree data structure 1481.

For example, the compiler 1472 may be a module of a router 1408 or other suitable network device that may need to install routes on the fly at a rate that is consistent with routing protocols, such as an Access Control List (ACL) protocol. As such, improving the compiler 1472 speed for performing compiler operations may improve performance of the router 1408. Embodiments disclosed herein improve compiler speed by enabling a decision for performing compiler operations such that time-consuming or resource intensive operations may be avoided by determining whether or not performing the operations would be productive.

Searching for redundant rules (also referred to herein as covered rules) may be time-consuming, frequently unproductive, or resource intensive due to allocation and freeing of memory resources used for tracking of the cover lists. A number of operations for performing a search for redundant rules at every node may be $N^2 \times M$, where N may be an average number of rules per node of the decision tree data structure and M may be the number of nodes in the decision tree data structure. If there are 1,000 average rules per node and 1,000,000 nodes in the decision tree data structure a number or operations for performing a search for redundant rules may be on the order of one trillion operations. As such, a compiler may be improved by avoiding a search for redundant rules by determining that the search would be unproductive (e.g., yields few redundant rules found). Embodiments disclosed herein enable a decision for whether or not to perform the search for redundant rules such that the search for redundant rules may only be performed if deemed to be productive (e.g., likely to find redundant rules) on the node avoiding waste of compute and storage resources.

A search for redundant rules of the node 1502 of FIG. 15 may be understood as being productive as the search would identify rules R2, R3, R4, R8, R9, and R10 as redundant rules. As described below, embodiments disclosed herein may compute a scope factor for the node and use the scope factor as an input parameter to a decision for performing a compiler operation. The compiler operation may be a search for redundant rules. In the example embodiment of FIG. 15, the scope factor computed for the node 1502 may be compared to a given threshold to decide whether or not to perform the search for redundant rules. In the example embodiment, the search for redundant rules may identify and remove the R2, R3, R4, R8, R9, and R10 rules from the node 1502 and populate the cover lists 1506a-d associated with the respective covering rules.

Figure 16B:
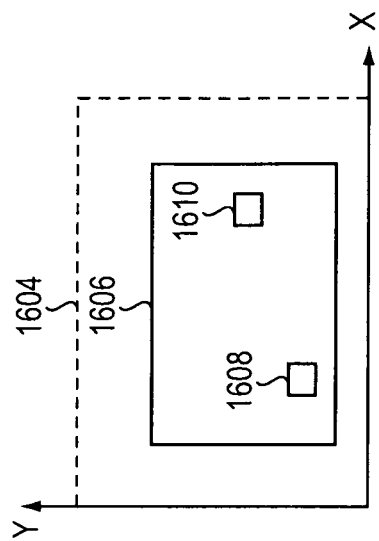
FIG. 16B is a block diagram of an example embodiment of a rule that covers other rules in a search space.
Figure 16A:
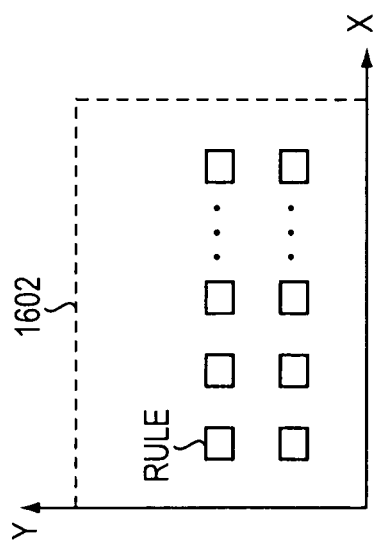
FIG. 16A is a block diagram of an example embodiment of rules that do not cover any rules in a search space.

FIG. 16A is a block diagram of an example embodiment of rules that do not cover any rules in a search space 1602.

FIG. 16B is a block diagram of an example embodiment of a rule that covers other rules in a search space 1604. Rules 1608 and 1610 are completely covered by a higher priority rule 1606 in the example embodiment. Embodiments disclosed herein recognize that wider rules, such as rule 1606, have a higher likelihood of covering other rules at a node. To determine whether or not to perform a search for redundant rules at the node, a portion of the search space covered by the node may be compared to the portion of the search space covered by the node's rules.

The node's rules' coverage may first be trimmed to a portion covered by the node, since a portion outside the node is irrelevant. Embodiments disclosed herein are based on a recognition that if each rule of the node tends to occupy only a small portion of the node, the rules of the node are unlikely to intersect with one another, much less cover each other completely. Thus, searching for covered rules for such a case is likely to be unproductive and with no benefit resulting from the costly compute time utilized.

Figure 17:
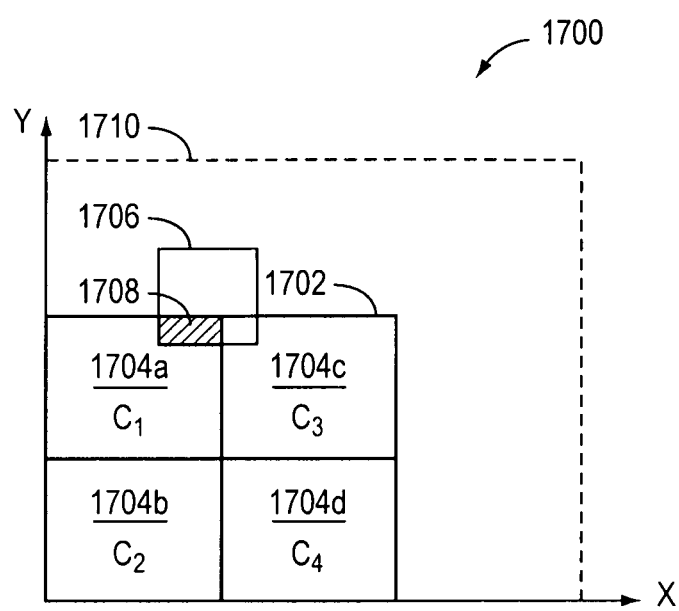
FIG. 17 is a block diagram of an example embodiment of a node covering a region of a search space.

FIG. 17 is a block diagram 1700 of an example embodiment of a node covering a region 1702 of a search space 1710. Embodiments disclosed herein may compute a rule scope value by intersecting each at least one field of the rule with a node portion of the search space covered by the node to identify non-intersecting portions of the rule. The non-intersecting portions identified may be trimmed from each at least one field of the rule. In the example embodiment of FIG. 17, the node has been cut into four children $C_1$, $C_2$, $C_3$, and $C_4$ covering regions 1704a-d of the search space 1710. A rule 1706 may be trimmed for a child node $C_1$ by excluding portions of the rule 1706 that are outside of the region 1704a covered by the child node $C_1$, keeping only the portion 1708 intersecting with the region 1704a of the child node $C_1$.

According to embodiments disclosed herein, a portion of the search space covered by a node may be computed as a base-2 logarithm of a number of unique key values covered by the node.

According to embodiments disclosed herein, a portion of the search space covered by a rule of a node may be computed as a base-2 logarithm of a number of unique key values covered by the node.

For example, if a node covers a two-dimensional range, such as 0-15 by 0-15, it may cover 256 different values. Since $\log_2(256)$ is 8, the node's coverage may be computed as 8. According to one embodiment, a base-2 log of the node or rule's coverage may be referred to as scope. Embodiments disclosed herein may compute scope at a node and may compute a scope factor based on an average scope of the node's rules after trimming the node's rules to a region of the node. Embodiments disclosed herein may compute scope of a node or node scope within a search space (e.g., the set of all possible key values). A node may have many rules. According to embodiments disclosed herein, rule scope may be computed for each rule of the node based on how much each rule intersects within the node's boundary (e.g., how much of the rule covers the node's portion of the search space). According to embodiments disclosed herein, an average rule scope of a node may be computed based on averaging the rule scope for all rules belonging to the node. According to embodiments disclosed herein, a scope factor of the node (also referred to herein as a node's scope factor, or scope factor) may be computed as a ratio of the average rule scope of the node to the node scope. According to embodiments disclosed herein, a comparison of the scope factor computed to a given threshold may enable a decision that avoids a time-consuming unproductive search for redundant rules at a node.

According to embodiments disclosed herein, a decision for performing a compiler operation at a node may be based on a comparison of the scope factor computed to a given threshold. According to one embodiment, if the average rule scope of a node is more than 75% of the node's scope, a compiler operation, such as a search for redundant rules, may be performed at the node, and otherwise avoided.

Figure 18:
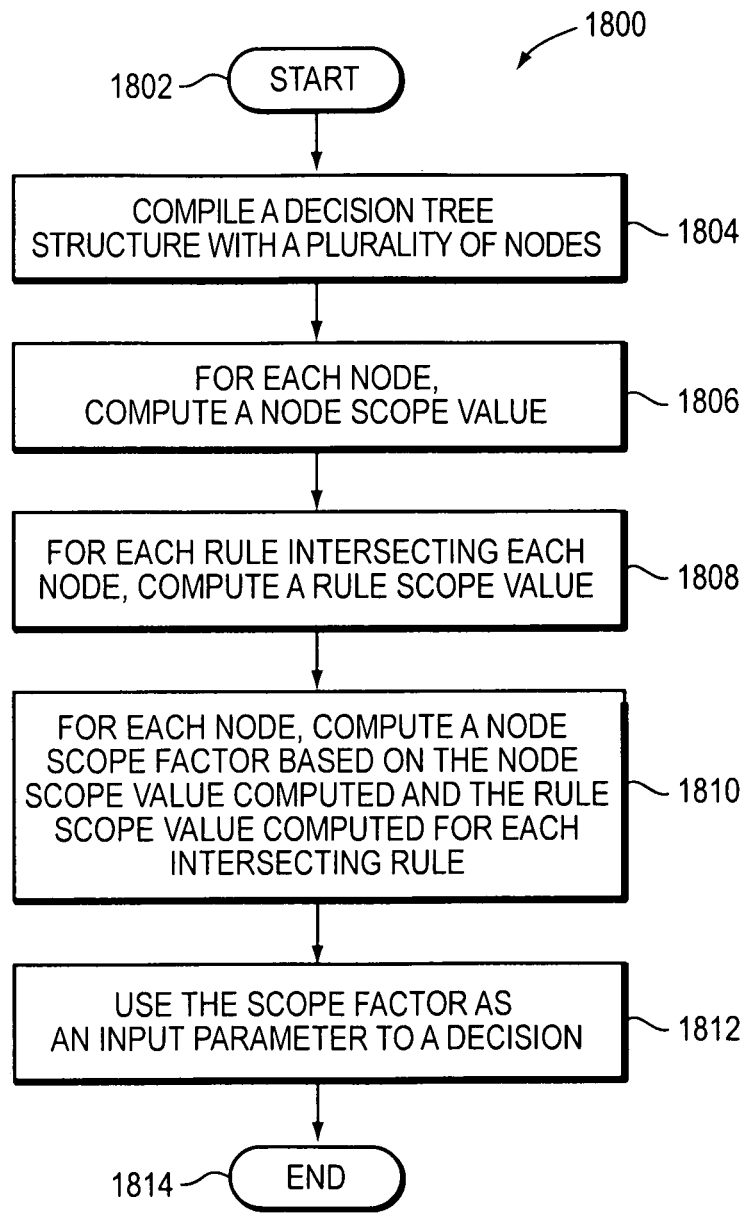
FIG. 18 is a flow diagram of an embodiment of a method.

FIG. 18 is a flow diagram of an embodiment of a method (1800). The method may begin (1802) and compile a decision tree data structure including a plurality of nodes using a classifier table having a plurality of rules representing a search space for packet classification (1804). The plurality of rules may have at least one field. The plurality of nodes may each cover a portion of the search space by representing successively smaller subsets of the plurality of rules with increasing depth in the decision tree. For each node of the decision tree, the method may compute a node scope value indicating a node portion of the search space covered by the node (1806). For each node of the decision tree, the method may for each rule intersecting the node, compute a rule scope value indicating a rule portion of the node portion covered by the rule. For each node of the decision tree, the method may compare the node portion of the search space covered by the node to an amount of the node portion covered by rules intersecting the node by computing a scope factor for the node based on the node scope value computed and the rule scope value computed for each rule (1810). The method may use the scope factor computed for at least one node of the plurality of nodes as an input parameter to a decision for performing a compiler operation at the at least one node (1812) and the method thereafter ends (1814) in the example embodiment.

According to one embodiment, the scope of a rule (or a node) may be a number of bits needed to enumerate all the values covered by the rule (or the node). As such, a rule covering 8 values, such as 0-7, requires three bits and thus yields a scope of three. A rule covering 8 values, such as 100-107, may also yield a scope of 3. A two-field rule covering a range 0-15 by 0-15 would require 4 bits for each field and, thus, would have a scope of 8. If a rule or a node has multiple fields, scopes of the individual fields may be summed together to get a total scope for the rule or the node.

Embodiments disclosed herein may compute scope of a rule within a node based on intersecting the rule with the node. For example, for a one-field node covering a range of [0-3] and two rules covering [2-3] and [2-100] respectively, intersecting the second rule with the node will reduce it to [2-3], and both rules will have the same scope, 1. According to embodiments disclosed herein, scope factor of a node may be computed by summing a node's fields' scopes, intersecting each rule with the node, summing each rule's fields' scopes, dividing each rule's total scope by the node's total scope to compute a ratio, and averaging the ratios computed. Alternatively each rule's total scope may be summed and averaged and subsequently divided by the node's total scope to compute the scope factor of the node.

Figure 19:
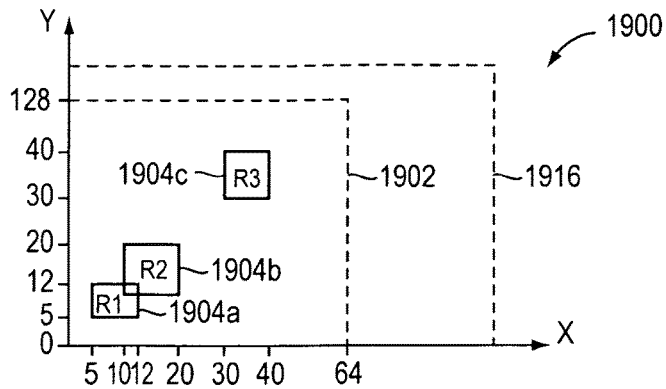
FIG. 19 is a block diagram of an example embodiment of computing a scope factor.

FIG. 19 is a block diagram of an example embodiment of computing a scope factor (1900). In the example embodiment, a node may cover a region 1902 of a search space 1916. The node of the example embodiment has two fields X and Y as shown and the node's field ranges are [0-64] for X and [0-128] for Y. A field scope for the X field may be computed as the number of bits needed to represent the node's width for X, which is six (e.g., $\log_2(64)=6$). The field scope for the Y field may be computed as the number of bits needed to represent node's width for Y, which is seven (e.g., $\log_2(128)=7$). A node scope 1910 for the example embodiment may be computed as the sum of the field scope of each field. As such the node scope 1910 in the example embodiment is 6+7=13.

In the example embodiment of FIG. 19, rule scope 1912 may be computed for rules R1 1904a, R2 1904b, and R3 1904c that have field regions intersecting within the node region 1902 boundary. The example table 1906 shows the X and Y field ranges for the rules R1 1904a, R2 1904b, and R3 1904c and the example rule scope table 1908 shows field scope and rule scope computations for the rules R1 1904a, R2 1904b, and R3 1904c according to embodiments disclosed herein.

In the example embodiment of FIG. 19, an average rule scope of the node 1914 may be computed based on averaging the rule scope 1912 for all rules belonging to the node (e.g., R1 1904a, R2 1904b, and R3 1904c), resulting in an average rule scope value of 6.4 in the example embodiment. To compute the scope factor for the node 1918, a ratio of the average rule scope of the node 1914 to the node scope 1910 may be computed as 6.4/13, or 0.49 in the example embodiment.

Embodiments disclosed herein may compute scope based on different field types, such as a range field, prefix field, exact-match field, or a mask field. Scope for a range field may be computed by intersecting the field with a node's range, for example the scope may be computed as $\log_2$ of the intersected range's size (high-low). For a prefix field, scope may be computed by converting the prefix field to a range field and computing the scope as $\log_2$ of the intersected range field's size (high-low). For an exact-match field, scope may be zero.

Embodiments disclosed herein may compute a scope of a rule intersected with a node. The node may be described by a bitstring. A node described by a bitstring may be referred to as a mask node. For a mask field, the node may be represented as a masked value, or description. A node's description may describe its extent (values covered) in all dimensions (fields). For non-mask fields, the extent may be described as a range. For mask fields, the extent may be described as a bitstring with don't-care bits. In general, a node may be described by a combination of ranges and bitstrings.

For example, a one-field node covering values [8-15] out of a search space [0-15] may be represented as 1xxx, where the x's represent don't-care bits. If a rule matches only even values, its description may be represented as xxx0. A scope of the rule intersected with the node is the number of bit positions in which both the rule and the node have don't-care bits. In this example there are two such bits (the two middle bits), so the scope is 2. As another example, a node might be described as 0x1x, covering the values 2, 3, 6, and 7. The rule and the node share don't-care bits at one position (the second from the left), as such, the scope may be 1.

For a mask field, computation of a node's scope may be based on a node's description. Instead of a low-high range, a node's description for a mask field may be a bitstring (e.g., a bitstring including any combination of 0s, 1s, or x's, where x's designate don't-care bits). A node's scope for the mask field may be a count of a number of don't-care bits in its description (e.g., its bitstring). For example, a node may have a description such as 1xxx or 0x1x. Such descriptions are examples, descriptions may have any suitable length and may use a 1, 0, or x for any bit in its description. According to embodiments disclosed herein, the node with the example 1xxx description may have a scope of 3 for the mask field, whereas the node with the example 0x1x description may have a node scope of 2 for the mask field, where the node's scope is based on the number of don't-care bits in the respective node's description. Such scopes may be added to the other fields' scopes as normal.

According to embodiments disclosed herein, a node scope value may increase as the node portion of the search space covered by the node increases. The node scope value may decrease as the node portion of the search space covered by the node decreases. Similarly, rule scope may increase as a rule portion of a node portion covered by the rule increases. The rule scope may decrease as the rule portion of the node portion covered by the rule decreases.

Figure 20:
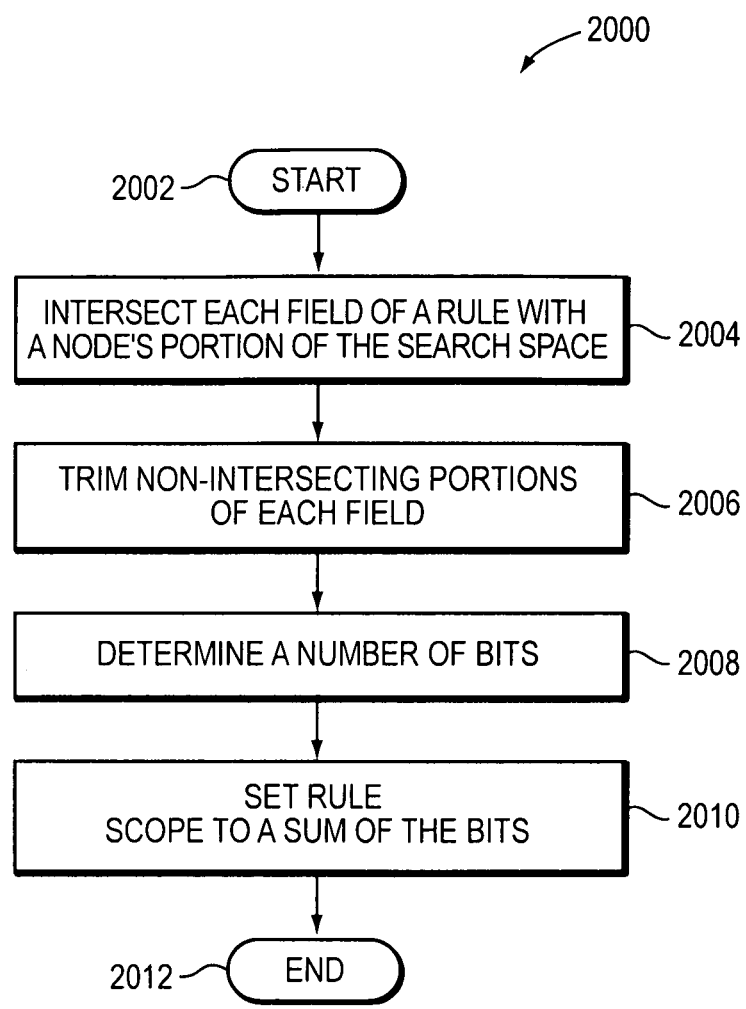
FIG. 20 is a flow diagram of an embodiment of a method for computing rule scope.

FIG. 20 is a flow diagram of an embodiment of a method for computing rule scope (2000). The method may begin (2002) and intersect each at least one field of the rule with the node portion of the search space covered by the node to identify non-intersecting portions of the rule (2004). The method may trim the non-intersecting portions identified from each at least one field of the rule (2006). The method may determine a number of bits for enumerating all values of the search space covered by each at least one field of the rule trimmed (2008). The method may set the rule scope value to a sum of the number of bits determined for each at least one field (2010) and the method thereafter ends (2012) in the example embodiment.

According to embodiments disclosed herein, scope may be used as an input parameter to a decision for performing a compiler operation at at least one node. In addition to using scope to determine whether or not to remove redundant rules at a node, embodiments disclosed herein may use scope to determine a number of cuts for the node.

Figure 21:
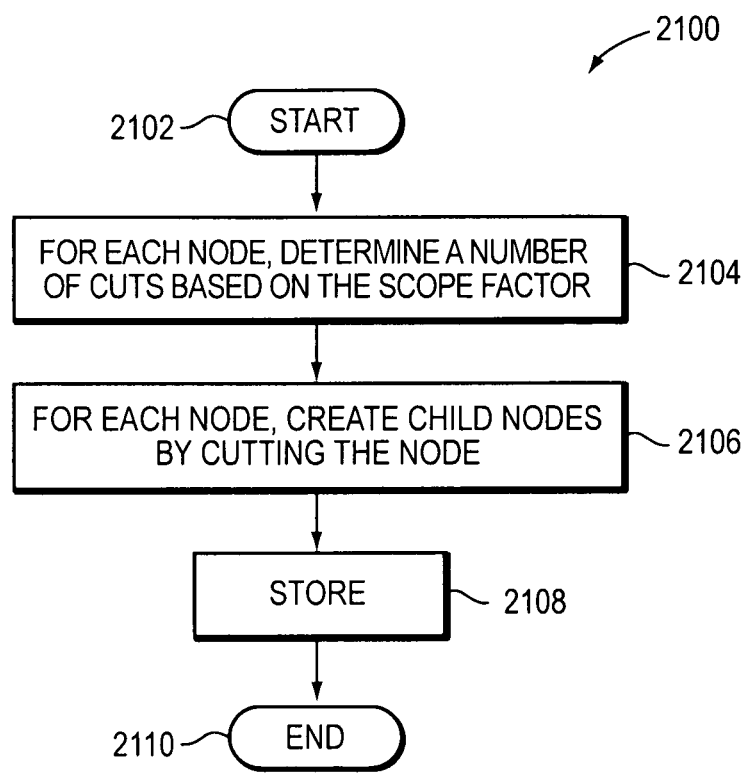
FIG. 21 is a flow diagram of a method for determining a number of cuts (2100).

FIG. 21 is a flow diagram of a method for determining a number of cuts (2100). The method may begin (2102) and for each node of the decision tree, determine a number of cuts for a selected one or more fields of the at least one field, the number of cuts being based on the scope factor computed for the node (2104). The method may for each node of the decision tree, create child nodes by cutting the node on a selected one or more bits of the selected one or more fields based on the number of cuts determined (2106). The method may store the decision tree structure (2108) and the method thereafter ends (2110) in the example embodiment.

According to another embodiment, scope may be used to control a decision for an amount of replication (e.g., a compiler node cutting operation) in a decision tree. A plurality of scope factor ranges may each be associated with a unique cutting range and a unique maximum replication factor to determine a number of cuts. According to embodiments disclosed herein, the number of cuts determined may increase as the scope factor decreases and the number of cuts determined may decrease as the scope factor computed increases.

Figure 22:
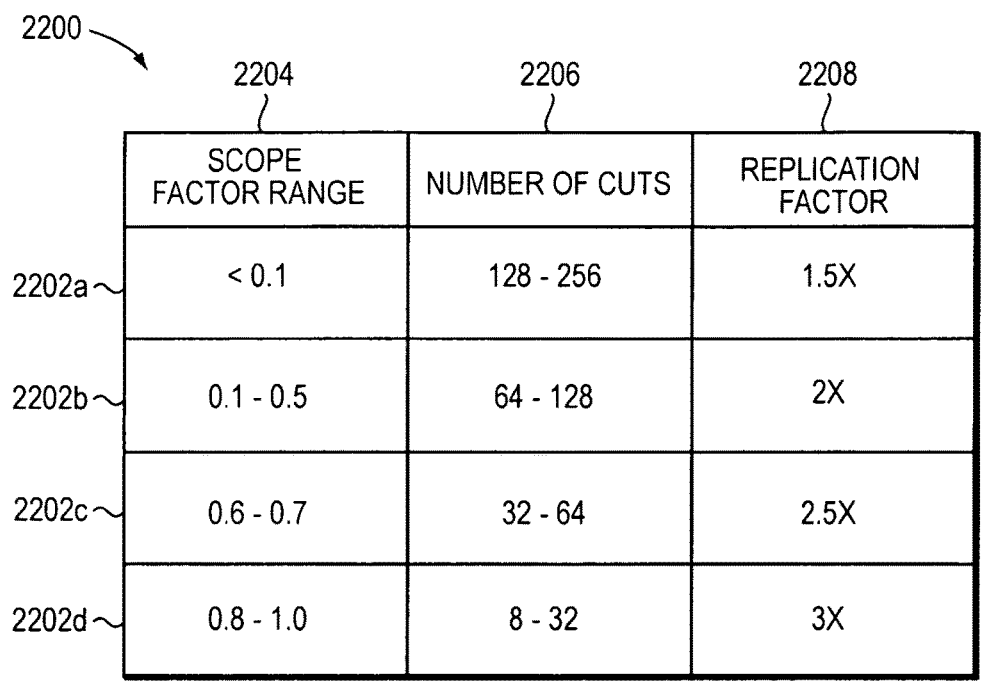
FIG. 22 is an example embodiment of a table including a plurality of scope factor ranges that may each be associated with a unique cutting range and a unique maximum replication factor.

FIG. 22 is an example embodiment of a table including a plurality of scope factor ranges that may each be associated with a unique cutting range and a unique maximum replication factor (2200). According to one embodiment, the table 2200 may be a lookup table (LUT) including entries with each association. However, such associations may be made in any suitable way.

The table 2200 may include entries 2202a-d that associate a scope factor range 2204 with a unique cutting range 2206 and a replication factor 2208. The table 2200 may enable a compiler of a decision tree structure to identify a unique cutting range that includes a range for a number of cuts. As such, a number of cuts for a node may be maximized subject to the unique cutting range identified and a comparison with an associated replication factor to efficiently identify a number of cuts to use for cutting a node.

In one example, a node scope factor may have been computed as 95%, or 0.95. According to embodiments disclosed herein the entry 2202d may be identified since the 0.95 scope factor is within the scope factor range (0.8-1.0) associated with the entry 2202d. A unique cutting range including a number of cuts in the range of 8-32 may be determined from the entry 2202d selected in the example embodiment. If an example node has 100 rules, and 8 cuts are used (e.g., a minimum value in the range 8-32), a total number of rules in the children nodes may be 170, yielding a replication factor of 1.7×. Since 1.7× may be compared as being less than the 3× replication factor of the entry 2202d, embodiments disclosed herein may iterate and select another number of cuts from the unique cutting range associated with the 2202d entry. For example, 16 cuts may be selected. With 16 cuts, a total number of rules in new children nodes may be 240 yielding replication of 2.4× that may still be less in comparison to the 3× replication factor associated with the 2202d entry. As such, 32 cuts may be selected on a next iteration. With 32 cuts, a total number of rules in new children nodes may be 320, yielding replication of 3.2× that may be compared as being greater than the 3× replication factor associated with the 2202d entry. As such, a number of cuts that is within a range of 16-31 may be selected in the example embodiment, enabling a narrow range for a number of cuts that is appropriate for the scope factor 0.95 to be quickly identified, thus improving efficiency and speed of the compiler operation.

Figure 23:
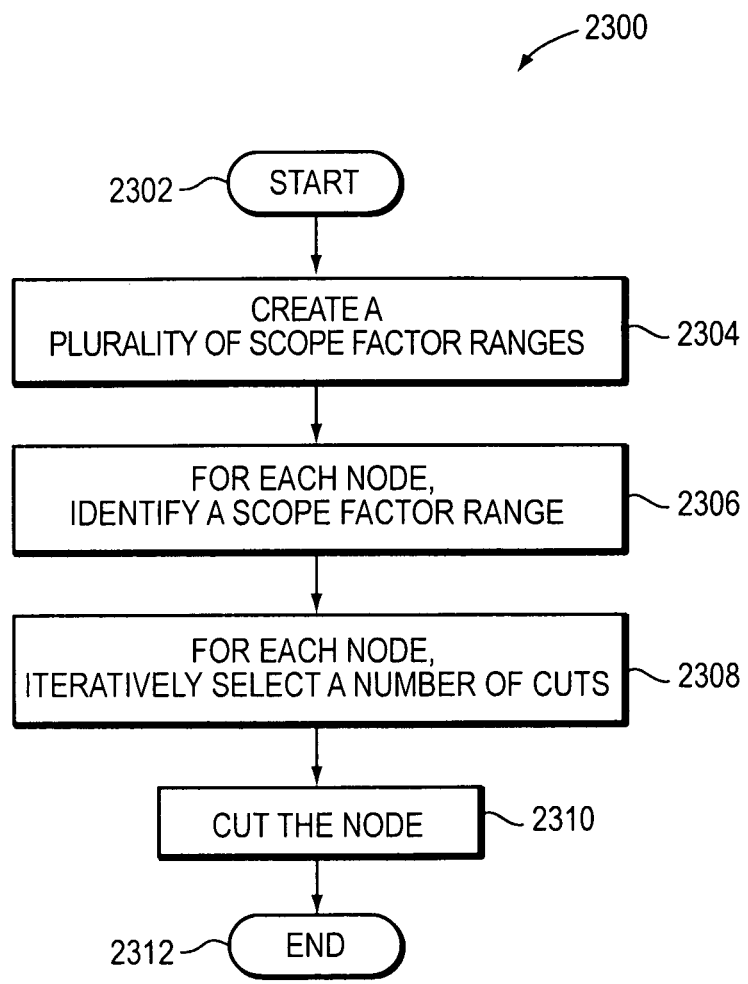
FIG. 23 is a flow diagram of an example embodiment of a method for determining a number of cuts for a node.

FIG. 23 is a flow diagram of an example embodiment of a method for determining a number of cuts for a node (2300). The method may begin (2302) and create a plurality of scope factor ranges and associate each scope factor range with a unique cutting range and a unique maximum replication factor (2304). The method may for each node of the decision tree, include identifying a scope factor range including the scope factor computed for the node (2306). The method may for each node of the decision tree, include identifying the unique cutting range associated with the scope factor range identified (2308). The method may for each node of the decision tree, include iteratively selecting a number of cuts from the unique cutting range identified, computing a total number of rules based on cuts of the node using the number of cuts iteratively selected, and setting a desired number of cuts to the number of cuts iteratively selected based on a comparison of the total number of rules computed divided by a number of rules represented by the node to the unique maximum replication factor associated with the scope factor range identified (2310). The desired number of cuts set may be a maximum value within the unique cutting range selected based on the comparison. The method may include cutting the node into children using the desired number of cuts set (2310) and the method thereafter ends (2312) in the example embodiment.

As rules may be added or deleted from a node, a scope factor for a node may increase or decrease. Instead of re-computing a node's scope factor, embodiments disclosed herein may store the node's scope factor and incrementally adjust the node's scope factor stored, enabling the node's scope factor to be incrementally adjusted based on the one or more rules added or deleted. One or more rules may be added or deleted from a node based on an incremental update. An incremental update may include an add, delete, or modify rule operation. As a result of adding, deleting, or modifying a rule, one or more updates to the decision tree structure may be determined. For example, adding a rule may result in one or more rules being removed from a node if the rule added is a higher priority rule that covers the one or more rules. Similarly, deleting a rule may result in one or more rules being added since the deleted rule may have been covering the one or more rules.

Figure 24:
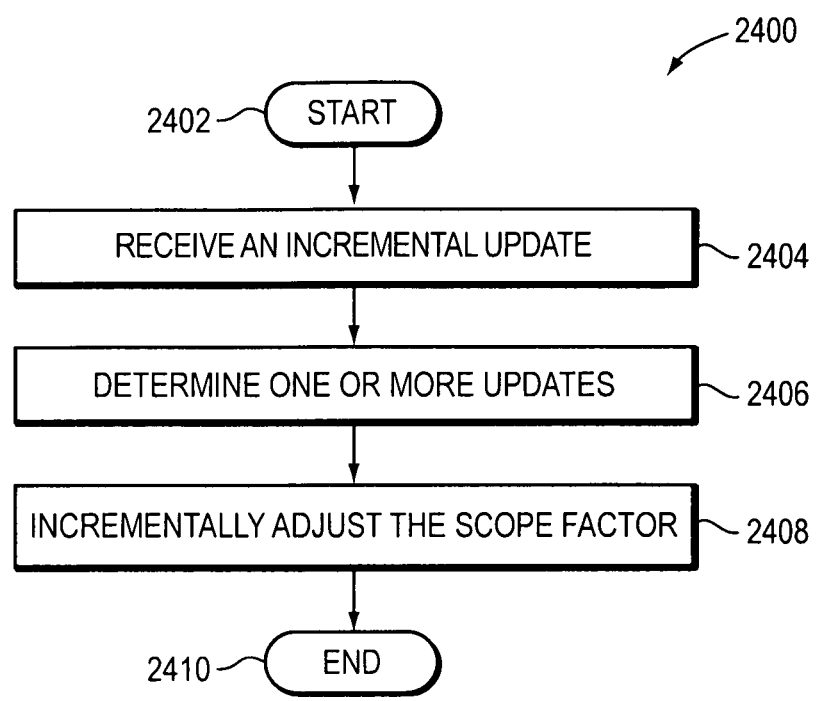
FIG. 24 is a flow diagram of an example embodiment of a method for receiving an incremental update.

FIG. 24 is a flow diagram of an example embodiment of a method for receiving an incremental update (2400). The method may begin (2402) and receive an incremental update for the decision tree structure compiled (2404). The method may determine one or more updates to the decision tree structure compiled based on the incremental update received (2406). The method may incrementally adjust the scope factor computed for at least one node of the plurality of nodes based on the one or more updates determined (2408) and the method thereafter ends (2410) in the example embodiment.

Embodiments disclosed herein improve a speed of a compiler of a decision tree. By recognizing that the compiler operates on fields of rules, embodiments disclosed herein may further improve a compiler's speed by storing a plurality of rules in a manner enabling improved speed of the compiler. Most of the operations done in the compiler, such as determining a number of cuts, removing redundant rules, etc., may access a specific dimension of all rules one after other. As such, embodiments disclosed herein may store rules in separate dimension tables rather than store dimensions together, reducing a number of memory accesses for accessing the rules.

For example, embodiments disclosed herein may store rules such that a cache line returns a same field of a plurality of rules. Because the compiler may be enabled to access the same field of multiple rules using one access, the compiler's speed may be improved by reducing a number of accesses to a device, such as a DRAM or other suitable storage device. Embodiments disclosed herein may group same fields of the at least one field of the plurality of rules enabling access to multiple same fields grouped in a single access by storing together the same fields grouped. The same fields grouped may have same field dimensions and may be fields of different rules.

A compiler of a decision tree data structure may determine a number of children for a node and split rules at the node into the child nodes cut from the node. If all of the rules of the node are assigned to each child, pruning is necessary. Pruning may include going over the rules assigned for each child and checking if the rules belong to that child or not. As such, pruning includes scanning an entire rule set of the node for each child, which may be an expensive operation as it is computationally intensive.

Embodiments disclosed herein may improve a compiler's speed by going over the rules only once, putting the rules into all the children based on a check for whether or not a given rule belongs to a given child. According to embodiments disclosed herein, for each node of the decision tree, the compiler may assign one or more rules from the list traversed in the single sweep to each of the child nodes created based on the one or more rules being within regions of the search space bounded by the child nodes created as a function of the cutting of the node.

For example, a rule from the list may be compared to a range of each child node to determine if the rule falls within a region of the child code. The region of the child node may be determined based on the cuts of the child node. Traversing the list of rules in the single sweep and assigning the rules based on whether or not the rules fall within a region of the child node may be less costly in terms of compute time than the alternative pruning method described above.

It should be understood that the block, flow, network diagrams may include more or fewer elements, be arranged differently, or be represented differently. It should be understood that implementation may dictate the block, flow, network diagrams and the number of block, flow, network diagrams illustrating the execution of embodiments described herein.

It should be understood that elements of the block, flow, network diagrams described above may be implemented in software, hardware, or firmware. In addition, the elements of the block, flow, network diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and other non-transitory forms of computer readable medium. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   compiling a decision tree data structure including a plurality of nodes using a classifier table having a plurality of rules representing a search space for packet classification, the plurality of rules having at least one field, the plurality of nodes each covering a portion of the search space by representing subsets of the plurality of rules;

for each node of the decision tree data structure, computing a scope factor for the node based on (a) a node scope value computed for the node, the node scope value indicating a node portion of the search space covered by the node, the node scope value computed by determining a minimum number of bits for enumerating all values of the search space covered by the node on a per field basis and setting the node scope value to a sum of the minimum number of bits determined for each at least one field, and (b) a rule scope value computed for each rule intersecting the node, the rule scope value indicating a rule portion of the node portion covered by the node; and using the scope factor computed for at least one node of the plurality of nodes as an input parameter to a decision for performing a compiler operation at the at least one node.

2. The method of claim 1 wherein computing the scope factor includes computing the rule scope value for each rule intersecting the node, wherein computing the rule scope value includes computing a rule field scope value for each at least one field of the rule intersecting the node and summing each rule field scope computed to compute a total rule scope value for the rule intersecting the node.

3. The method of claim 1 wherein computing the scope factor for the node includes computing an average rule scope of the node by averaging the rule scope value computed for each rule and computing a ratio of the average rule scope to the node scope value computed for the node.

4. The method of claim 1 wherein the compiler operation includes searching for redundant rules at the at least one node and the decision for performing the compiler operation at the at least one node is based on a comparison of the scope factor computed to a given threshold.

5. The method of claim 4 wherein the comparison of the scope factor computed to the given threshold enables avoiding a time-consuming unproductive search for redundant rules at the at least one node.

6. The method of claim 4 wherein the plurality of rules have an associated priority and searching for redundant rules at the at least one node includes:

determining whether or not a given rule represented by the at least one node is covered by one or more other higher priority rules represented by the at least one node;

omitting the given rule from the at least one node and other nodes cut from the at least one node if the given rule is covered; and populating one or more cover lists for the one or more higher priority rules to include the given rule omitted, the one or more cover lists each being associated with the at least one node.

7. The method of claim 1 further comprising:
for each node of the decision tree data structure:
determining a number of cuts for a selected one or more fields of the at least one field, wherein the number of cuts is based on the scope factor computed for the node;
creating child nodes by cutting the node on a selected one or more bits of the selected one or more fields based on the number of cuts determined; and
storing the decision tree data structure.

8. The method of claim 7 wherein the number of cuts determined increases as the scope factor computed decreases and the number of cuts determined decreases as the scope factor computed increases.

9. An apparatus comprising:
a memory;
a processor coupled to the memory, the processor configured to:
compile a decision tree data structure including a plurality of nodes using a classifier table having a plurality of rules representing a search space for packet classification, the plurality of rules having at least one field, the plurality of nodes each covering a portion of the search space by representing subsets of the plurality of rules;
for each node of the decision tree data structure, compute a scope factor for the node based on (a) a node scope value computed for the node, the node scope value indicating a node portion of the search space covered by the node, the node scope value computed by determining a minimum number of bits for enumerating all values of the search space covered by the node on a per field basis and setting the node scope value to a sum of the minimum number of bits determined for each at least one field, and (b) a rule scope value computed for each rule intersecting the node, the rule scope value indicating a rule portion of the node portion covered by the node; and
use the scope factor computed for at least one node of the plurality of nodes as an input parameter to a decision for performing a compiler operation at the at least one node.

10. The apparatus of claim 9 wherein to compute the scope factor, the processor is further configured to compute the rule scope value for each rule intersecting the node, wherein to compute the rule scope value, the processor is further configured to compute a rule field scope value for each at least one field of the rule intersecting the node and sum each rule field scope computed to compute a total rule scope value for the rule intersecting the node.

11. The apparatus of claim 9 wherein to compute the scope factor for the node, the processor is further configured to compute an average rule scope of the node by averaging the rule scope value computed for each rule and compute a ratio of the average rule scope to the node scope value computed for the node.

12. The apparatus of claim 9 wherein the compiler operation includes searching for redundant rules at the at least one node and the decision for performing the compiler operation at the at least one node is based on a comparison of the scope factor computed to a given threshold.

13. The apparatus of claim 12 wherein the comparison of the scope factor computed to the given threshold enables avoiding a time-consuming unproductive search for redundant rules at the at least one node.

14. The apparatus of claim 12 wherein the plurality of rules have an associated priority and searching for redundant rules at the at least one node includes:

determining whether or not a given rule represented by the at least one node is covered by one or more other higher priority rules represented by the at least one node;

omitting the given rule from the at least one node and other nodes cut from the at least one node if the given rule is covered; and populating one or more cover lists for the one or more higher priority rules to include the given rule omitted, the one or more cover lists each being associated with the at least one node.

15. The apparatus of claim 9 wherein the processor is further configured to:
for each node of the decision tree data structure:
determine a number of cuts for a selected one or more fields of the at least one field, wherein the number of cuts is based on the scope factor computed for the node;
create child nodes by cutting the node on a selected one or more bits of the selected one or more fields based on the number of cuts determined; and
store the decision tree data structure.

16. The apparatus of claim 15 wherein the number of cuts determined increases as the scope factor computed decreases and the number of cuts determined decreases as the scope factor computed increases.

17. A non-transitory computer-readable medium having encoded thereon a sequence of instructions which, when loaded and executed by a processor, causes the processor to:
compile a decision tree data structure including a plurality of nodes using a classifier table having a plurality of rules representing a search space for packet classification, the plurality of rules having at least one field, the plurality of nodes each covering a portion of the search space by representing subsets of the plurality of rules;
for each node of the decision tree data structure, compute a scope factor for the node based on (a) a node scope value computed for the node, the node scope value indicating a node portion of the search space covered by the node, the node scope value computed by determining a minimum number of bits for enumerating all values of the search space covered by the node on a per field basis and setting the node scope value to a sum of the minimum number of bits determined for each at least one field, and (b) a rule scope value computed for each rule intersecting the node, the rule scope value indicating a rule portion of the node portion covered by the node; and
use the scope factor computed for at least one node of the plurality of nodes as an input parameter to a decision for performing a compiler operation at the at least one node.

18. The non-transitory computer-readable medium of claim 17 wherein the compiler operation includes searching for redundant rules at the at least one node and the decision for performing the compiler operation at the at least one node is based on a comparison of the scope factor computed to a given threshold, wherein the comparison of the scope factor computed to the given threshold enables avoiding a time-consuming unproductive search for redundant rules at the at least one node.

* * * * *